(12) United States Patent
Iwano

(10) Patent No.: US 10,680,527 B2
(45) Date of Patent: Jun. 9, 2020

(54) PULSE SIGNAL OUTPUT CIRCUIT

(71) Applicant: Yokogawa Electric Corporation, Musashino-shi, Tokyo (JP)

(72) Inventor: Youichi Iwano, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/423,825

(22) Filed: May 28, 2019

(65) Prior Publication Data

US 2019/0372469 A1 Dec. 5, 2019

(30) Foreign Application Priority Data

May 30, 2018 (JP) .................... 2018-104094

(51) Int. Cl.
*H02M 3/335* (2006.01)
*H04L 25/02* (2006.01)

(52) U.S. Cl.
CPC ........ *H02M 3/33569* (2013.01); *H04L 25/02* (2013.01)

(58) Field of Classification Search
CPC .......................... H02M 3/33569; H04L 25/02
See application file for complete search history.

(56) References Cited

U.S. PATENT DOCUMENTS

| | | | | |
|---|---|---|---|---|
| 4,748,351 A | * | 5/1988 | Barzegar | H03K 17/691 327/384 |
| 7,439,636 B2 | * | 10/2008 | Lewis | H03K 17/6874 307/117 |
| 8,526,206 B2 | * | 9/2013 | Fotherby | H02M 1/08 327/424 |
| 9,496,862 B2 | * | 11/2016 | Ridder | H03K 17/04123 |
| 9,590,621 B2 | * | 3/2017 | Young | H03K 17/691 |
| 9,966,837 B1 | * | 5/2018 | Seaton | H02M 3/155 |
| 10,038,435 B2 | * | 7/2018 | Yuzurihara | H02M 1/08 |

(Continued)

FOREIGN PATENT DOCUMENTS

| | | |
|---|---|---|
| JP | 56-157512 A | 12/1981 |
| JP | 58-127563 A | 7/1983 |
| JP | 2000-134928 A | 5/2000 |

(Continued)

*Primary Examiner* — Thomas J. Hiltunen
(74) *Attorney, Agent, or Firm* — Sughrue Mion, PLLC

(57) ABSTRACT

A circuit for outputting a pulse signal includes: a pulse transformer configured to include a primary coil and a secondary coil; a switch section configured to switch a direction of application of current; a primary-side capacitor disposed on a path for primary-side current; a rectifying section configured to rectify secondary-side voltage and output the rectified voltage; a secondary-side capacitor configured to be charged with the rectified voltage and release charge; a transistor configured to be switched on and off according to voltage of the secondary-side capacitor; and a controller configured to control timings when the switch section switches the direction of application of the primary-side current. And the controller is configured to perform control to switch the direction of application of the primary-side current, when primary-side voltage oscillates and changes to an opposite polarity at a start timing of one switching period of the switch section.

10 Claims, 12 Drawing Sheets

(56) References Cited

U.S. PATENT DOCUMENTS

2003/0164721 A1* 9/2003 Reichard .............. H03K 17/567
   327/108
2017/0005652 A1* 1/2017 Hatano ................ H03K 17/165

FOREIGN PATENT DOCUMENTS

JP      2004-179771 A    6/2004
JP      2013-222978 A   10/2013

* cited by examiner

PULSE SIGNAL OUTPUT CIRCUIT

CROSS-REFERENCE TO RELATED APPLICATIONS

This application is based on and claims priority under 35 USC 119 from Japanese Patent Application No. 2018-104094 filed on May 30, 2018, the contents of which are incorporated herein by reference.

TECHNICAL FIELD

The present invention relates to a pulse signal output circuit.

BACKGROUND ART

Pulse signal output circuits for generating a pulse signal and outputting the pulse signal have been used in various applications. For example, in Japanese Patent Application Publication Laid-Open No. 2013-222978 (hereinafter, referred to as Patent Literature 1), a technology for a pulse signal output circuit usable to transmit a process quantity measured by a field indicator installed at the processing site by a pulse signal is disclosed. The pulse signal output circuit disclosed in Patent Literature 1 includes a switch section, a primary-side capacitor, a pulse transformer, a rectifying section, a secondary-side capacitor, a resistor, and a field effect transistor (FET). Further, the pulse signal output circuit disclosed in Patent Literature 1 generates a pulse signal by turning on or off each of switches included in the switch section connected to a DC power supply, and outputs the pulse signal.

Specifically, in the pulse signal output circuit disclosed in Patent Literature 1, in order to switch the pulse signal to be output, to the low level, each of the switches included in the switch section is turned on or off such that the current output from the DC power supply is applied to the primary side of the pulse transformer via the primary-side capacitor. In this case, in the pulse signal output circuit disclosed in Patent Literature 1, the pulse transformer is excited by the current applied to the primary side, whereby voltage attributable to the voltage between both terminals of the primary coil is induced between both terminals of the secondary coil. Thereafter, in the pulse signal output circuit disclosed in Patent Literature 1, the voltage induced on the secondary side by the pulse transformer is subjected to full-wave rectification by the rectifying section, and is applied between the gate and source of the FET and between the terminals of each of the secondary-side capacitor and the resistor. Therefore, in the pulse signal output circuit disclosed in Patent Literature 1, by the voltage subjected to full-wave rectification, the secondary-side capacitor is changed, and the FET is switched on, and the pulse signal transitions to the low level. In the pulse signal output circuit disclosed in Patent Literature 1, if a switch included in the switch section provided on the primary side of the pulse transformer is switched from the OFF state to the ON state, a large amount of current temporarily flows in the secondary-side circuit of the pulse transformer. Thereafter, the current flowing in the secondary-side circuit decreases and becomes 0 A. Therefore, in the pulse signal output circuit disclosed in Patent Literature 1, the voltage which is applied between the source and gate of the FET and between the terminals of each of the secondary-side capacitor and the resistor also decreases. However, in the pulse signal output circuit disclosed in Patent Literature 1, if the current flowing in secondary-side circuit of the pulse transformer becomes 0 A, the charge stored in the secondary-side capacitor is released, so the FET is maintained in the ON state, and the pulse signal also is maintained at the low level.

Also, in the pulse signal output circuit disclosed in Patent Literature 1, the switch section is configured to be switched on or off such that the direction of application of the current output from the DC power supply to the primary side of the pulse transformer is reversed. More specifically, in the pulse signal output circuit disclosed in Patent Literature 1, the switch section has a switch for applying the current in the positive direction (hereinafter, referred to as the "positive-direction switch"), and a switch for applying the current in the negative direction (hereinafter, referred to as the "negative-direction switch"). Further, in the pulse signal output circuit disclosed in Patent Literature 1, switching of each of the positive-direction switch and the negative-direction switch between the ON state and the OFF state is exclusively (complementarily) controlled. In other words, in the pulse signal output circuit disclosed in Patent Literature 1, when the positive-direction switch is switched on, the negative-direction switch is switched off, whereby the current is applied in the positive direction to the primary side of the pulse transformer; whereas when the negative-direction switch is switched on, the positive-direction switch is switched off, whereby the current is applied in the negative direction to the primary side of the pulse transformer. Therefore, in the pulse signal output circuit disclosed in Patent Literature 1, when the switch section applies the current in the negative direction to the primary side of the pulse transformer, in the pulse transformer, the reverse voltage is induced between both terminals of the secondary coil. Therefore, in the pulse signal output circuit disclosed in Patent Literature 1, the direction of the current flowing in the secondary side of the pulse transformer also is reversed.

However, in the pulse signal output circuit disclosed in Patent Literature 1, since the voltage induced on the secondary side is subjected to full-wave rectification by the rectifying section, even when the reverse voltage is induced on the secondary side of the pulse transformer, the voltage having the same state as the state when the switch section applies the current in the positive direction to the primary side of the pulse transformer is applied between the terminals of each of the secondary-side capacitor and the resistor. In other words, in the pulse signal output circuit disclosed in Patent Literature 1, even when the pulse transformer causes the reverse voltage is induced on the secondary side of the pulse transformer, the voltage between the gate and source of the FET rises. Therefore, in the pulse signal output circuit disclosed in Patent Literature 1, even when the switch section applies the current in the negative direction to the primary side of the pulse transformer, the FET is maintained in the ON state, and the pulse signal also is maintained at the low level.

Meanwhile, in the pulse signal output circuit disclosed in Patent Literature 1, in order to switch the pulse signal to the high level, the states of the switches included in the switch section are maintained in their states. Then, in the pulse signal output circuit disclosed in Patent Literature 1, the voltage which is induced on the secondary side by the pulse transformer becomes constant without changing. In other words, in the pulse signal output circuit disclosed in Patent Literature 1, the direction of the voltage which is induced on the secondary side of the pulse transformer is fixed to any one direction of the positive direction and the negative direction, and the direction of the current also is fixed to one direction. Therefore, in the pulse signal output circuit disclosed in Patent Literature 1, if the current flowing in the secondary-side circuit of the pulse transformer becomes 0 A, and all of the charge stored in the secondary-side capacitor is released, the FET is switched off, and the pulse signal transitions to the high level.

As described above, in the pulse signal output circuit disclosed in Patent Literature 1, each of the switches included in the switch section connected to the DC power supply is switch on or off, whereby the FET is switched on or off. As a result, the pulse signal is generated.

By the way, like in the pulse signal output circuit disclosed in Patent Literature 1, the primary side and the secondary side are insulated from each other in direct-current wise by the pulse transformer. The primary side and secondary side of the pulse transformer are coupled in alternate-current wise. Therefore, in the case where the degree of AC coupling is low, the amount of power which is transmitted from the primary side of the pulse transformer to the secondary side is small. For this reason, it is required to improve the efficiency of transmission of power from the primary side to the secondary side.

However, in the pulse signal output circuit disclosed in Patent Literature 1, since the voltage between the terminals of each of the primary coil and secondary coil of the pulse transformer oscillates due to attributable to series resonance of the inductance component of the primary side of the pulse transformer and the primary-side capacitor (such oscillation is called ringing), depending on the timing when the switches included in the switch section are switched on or off, when the switches are switched, the voltage value of the voltage may decrease by a value depending on oscillation. In this case, the amount of power which is transmitted from the primary side to the secondary side decreases, and the efficiency of transmission of power from the primary side of the pulse transformer to the secondary side decreases (the details will be described below with reference to FIG. 12).

Now, an example of the case where in the pulse signal output circuit disclosed in Patent Literature 1, the efficiency of transmission of power from the primary side of the pulse transformer to the secondary side decreases will be described. FIG. 12 is a timing chart illustrating an example of the case where the power transmission efficiency in the pulse signal output circuit of the related art decreases. FIG. 12 shows an example of the ON/OFF states of the positive-direction switch and the negative-direction switch which are controlled in the pulse signal output circuit disclosed in Patent Literature 1 in order to switch the pulse signal to be output to the low level, and the voltage and current of the primary side of the pulse transformer (the primary-side voltage and the primary-side current) which change according to the states of the switches. Also, it can be said that the waveform of the primary-side voltage shown in FIG. 12 is the same as the waveform of the voltage of the secondary side of the pulse transformer (the secondary-side voltage) although the primary-side voltage and the secondary-side voltage are different in voltage value.

In the timing chart shown in FIG. 12, at a timing t0, a timing t1, and a timing t2, each of the positive-direction switch and the negative-direction switch is switched on or off. As shown in FIG. 12, if each of the positive-direction switch and the negative-direction switch is switched on or off, the primary-side voltage of the pulse transformer oscillates due to series resonance of the inductance component of the primary side of the pulse transformer and the primary-side capacitor. Also, the primary-side current of the pulse transformer oscillates according to the oscillation of the primary-side voltage. Also, the oscillation frequency of the primary-side voltage is determined according to the inductance value of the inductance component of the primary side of the pulse transformer and the capacitance value of the primary-side capacitor, and the degree of damping of oscillation is determined according to the resistance value of each of the positive-direction switch and the negative-direction switch in the ON state, and the resistance value of the primary coil of the pulse transformer.

In the timing chart shown in FIG. 12, the waveform of the primary-side voltage around the timing t1 when the positive-direction switch and the negative-direction switch are switched is worth noticing. At the timing t1, the positive-direction switch and the negative-direction switch are switched, whereby the current is applied in the negative direction to the primary side of the pulse transformer. As a result, the primary-side voltage changes to negative voltage. By the way, at the timing t0, the positive-direction switch and the negative-direction switch are switched, whereby the current is applied in the positive direction to the primary side of the pulse transformer, so the primary-side voltage changes to positive voltage. Thereafter, the primary-side voltage oscillates due to series resonance of the inductance component of the primary side of the pulse transformer and the primary-side capacitor. However, the oscillation of the primary-side voltage does not converge until the timing immediately before the timing t1 when the switches are switched, and at the timing t1, the primary-side voltage has a voltage value of Va. For this reason, at the timing t1, the primary-side voltage changes to a voltage value of −V+Va, i.e. a negative voltage higher than −V by Va. In FIG. 12, it is shown that since the direction of the primary-side voltage is switched to the negative direction at the timing t1, the primary-side voltage drops to the voltage higher than the voltage of −V by the voltage value of Va, not to the voltage of −V. In this case, the secondary-side voltage which is induced on the secondary side of the pulse transformer also changes similarly. Therefore, in the pulse signal output circuit of the related art, the amount of power which is transmitted from the primary side of the pulse transformer to the secondary side decreases, and the efficiency of transmission of power from the primary side to the secondary side decreases.

Also, in FIG. 12, it is shown that at the timing t2 when the positive-direction switch and the negative-direction switch are switched, since oscillation of the primary-side voltage has converged, the primary-side voltage changes to the voltage of +V, not to a voltage lower than voltage of +V. However, even at the timing t2 shown in FIG. 12, if oscillation of the primary-side voltage has not converged, similarly, the primary-side voltage changes to a voltage lower than the voltage of +V, and the secondary-side voltage which is induced on the secondary side by the pulse transformer also changes, and the efficiency of transmission of power from the primary side to the secondary side decreases.

The present invention was made in view of the above-mentioned problem, and an object of the present invention is to provide a pulse signal output circuit which has a configuration using a pulse transformer insulating the primary side and the secondary side from each other, and can improve the efficiency of transmission of power from the primary side of a pulse transformer to the secondary side.

SUMMARY OF INVENTION

To solve the aforementioned problem, a pulse signal output circuit related to the present invention is a pulse signal output circuit for outputting a pulse signal based on current supplied from a DC power supply connected to the pulse signal output circuit. The pulse signal output circuit includes: a pulse transformer configured to include a primary coil and a secondary coil; a switch section configured to switch a direction of application of the current to serve as primary-side current to the primary coil of the pulse transformer; a primary-side capacitor disposed on a path for the primary-side current; a rectifying section configured to rectify secondary-side voltage induced on the secondary coil based on primary-side voltage applied to the primary coil according to the primary-side current, and output the rectified voltage; a secondary-side capacitor configured to be charged with the rectified voltage and release charge; a transistor configured to be switched on and off according to voltage of the secondary-side capacitor; and a switching-timing controller configured to control timings when the switch section switches the direction of application of the primary-side current. And the switching-timing controller is configured to perform control to switch the direction of application of the primary-side current, when the primary-side voltage oscillates due to series resonance of the primary coil and the primary-side capacitor and a polarity of the primary-side voltage is opposite to a polarity of the primary-side voltage at a start timing of one switching period of the switch section.

According to the present invention, after the switch section switches the direction of application of the primary-side current, the primary-side voltage which is applied to the primary coil of the pulse transformer becomes higher. Therefore, the pulse signal output circuit can efficiently transmit the primary-side voltage applied to the primary coil of the pulse transformer to the secondary coil, thereby inducing the secondary-side voltage on the secondary coil.

The switching-timing controller may be configured to perform control to switch the direction of application of the primary-side current, at a timing when oscillation of the primary-side voltage has a peak having the opposite polarity.

According to the present invention, in the case where the primary-side voltage oscillates due to series resonance of the primary coil and a polarity of the primary-side voltage is opposite, the pulse signal output circuit performs switching when the primary-side voltage has a high voltage value peak having the opposite polarity, such that the primary-side current changes to a voltage value having a larger absolute value. Therefore, it is possible to further improve the efficiency of transmission of power from the primary coil of the pulse transformer to the secondary coil.

The switching-timing controller may be configured to perform control to switch the direction of application of the primary-side current, at a timing when the oscillation of the primary-side voltage has the first peak having the opposite polarity after the start timing.

According to the present invention, in the case where the primary-side voltage oscillates due to series resonance of the primary coil and a polarity of the primary-side voltage is opposite, the pulse signal output circuit performs switching when the primary-side voltage has the highest voltage value peak having the opposite polarity, such that the primary-side current changes to a voltage value having a much larger absolute value. Therefore, it is possible to further more improve the efficiency of transmission of power from the primary coil of the pulse transformer to the secondary coil.

A switching time indicating a timing to switch the direction of application of the primary-side current may be set in advance, and the switching-timing controller may be configured to start to measure elapsed time from the start timing, and is configured to perform control to switch the direction of application of the primary-side current at a timing when the measured elapsed time reaches the switching time set in advance.

The switching time may be a time which is calculated in advance based on an inductance value of the primary coil and a capacitance value of the primary-side capacitor.

According to the present invention, the pulse signal output circuit sets the switching time calculated from the characteristic values of the pulse transformer and the primary-side capacitor in advance, and control the switch section at the switching time by the switching-timing controller having the simple configuration such that the switch section switches the direction of application of the primary-side current. Therefore, according to the pulse signal output circuit, it is possible to improve the efficiency of transmission of power from the primary coil of the pulse transformer to the secondary coil by the simple configuration suitable for the characteristic values of the pulse transformer and the primary-side capacitor.

The switching-timing controller may further include a timing detection circuit configured to acquire a voltage value of the primary-side voltage, and to detect a timing to switch the direction of application of the primary-side current based on the acquired voltage value, and the switching-timing controller may be configured to perform control to switch the direction of application of the primary-side current, when the timing detection circuit detects the timing to switch the direction of application of the primary-side current.

According to the present invention, in the pulse signal output circuit, the switching-timing controller measures the primary-side voltage. Therefore, if the primary-side voltage oscillates and a polarity of the primary-side voltage is opposite, it is possible to surely detect the timing of the highest voltage value peak having the opposite polarity, and control the switch section such that the switch section switches the direction of application of the primary-side current. Therefore, according to the pulse signal output circuit, it is possible to more surely improve the efficiency of transmission of power from the primary coil of the pulse transformer to the secondary coil.

The pulse signal output circuit may further include a primary-side resistor configured to suppress oscillation of the primary-side voltage, the oscillation being attributable to the series resonance.

According to the present invention, after the switch section switches the direction of application of the primary-side current, the pulse signal output circuit can quickly converge oscillation of the primary-side voltage by the primary-side resistor. Therefore, according to the pulse signal output circuit, it is possible to improve the efficiency of transmission of power from the primary coil of the pulse transformer to the secondary coil, and it is possible to suppress extra power consumption from being caused by large oscillation in the primary-side circuit.

The switch section may include an output voltage selection circuit configured to output either DC voltage supplied from a DC power supply or reference voltage, depending on control which the switching-timing controller performs to switch the direction of application of the primary-side current.

According to the present invention, the pulse signal output circuit can switch the direction of application of the primary-side current by the switch section having less components. Therefore, according to the pulse signal output circuit, it is possible to improve the efficiency of transmission of power from the primary coil of the pulse transformer to the secondary coil, and implement the pulse signal output circuit in a smaller size at lower cost. Also, it is possible to decrease drain of the DC power supply connected to the pulse signal output circuit, and reduce the load on the DC power supply.

The rectifying section may be a bridge rectifier circuit having a bridge circuit including four diodes.

According to this configuration, the pulse signal output circuit can rectify the secondary-side voltage transmitted with high transmission efficiency, and apply the rectified voltage as the drive voltage for driving the gate terminal of the transistor.

The rectifying section may be a voltage doubler rectifier circuit which includes one capacitor and two diodes.

According to the present invention, the pulse signal output circuit can rectify the secondary-side voltage transmitted with high transmission efficiency by the rectifying section having less components, and apply the rectified voltage as the drive voltage for driving the gate terminal of the transistor, and it is possible to implement the pulse signal output circuit in a smaller size at lower cost.

According to the present invention, it is possible to obtain the effect that it is possible to provide a pulse signal output circuit which has a configuration using a pulse transformer insulating the primary side and the secondary side from each other, and can improve the efficiency of transmission of power from the primary side of a pulse transformer to the secondary side.

BRIEF DESCRIPTION OF DRAWINGS

Exemplary embodiment(s) of the present invention will be described in detail based on the following figures, wherein.

DESCRIPTION OF EMBODIMENTS

First Embodiment

Figure 1:
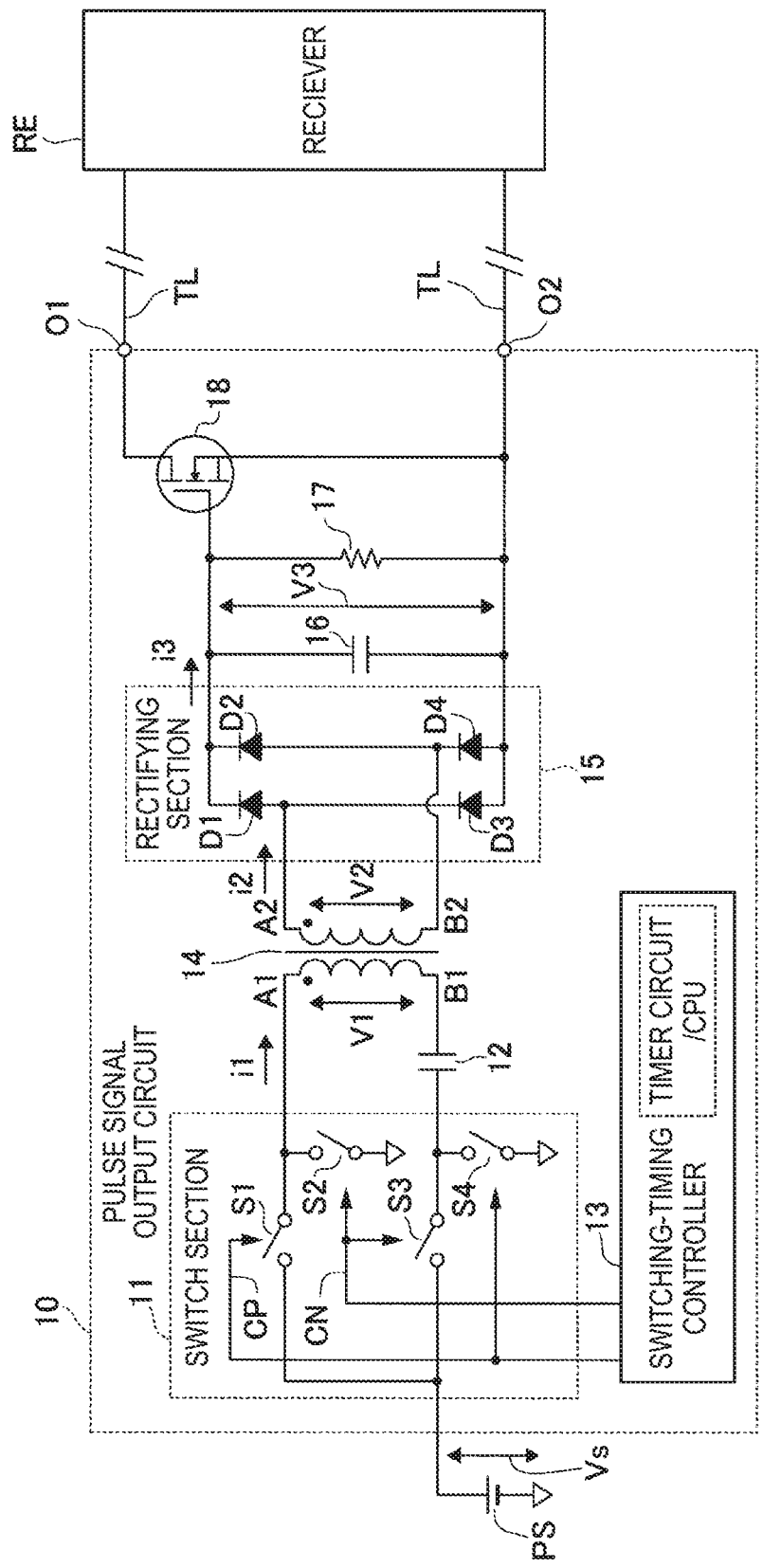
FIG. 1 is a configuration diagram illustrating the configuration of a pulse signal output circuit according to a first embodiment of the present invention.

Hereinafter, embodiments of the present invention will be described with reference to the drawings. FIG. 1 is a configuration diagram illustrating the configuration of a pulse signal output circuit according to a first embodiment of the present invention. A pulse signal output circuit 10 includes a switch section 11, a primary-side capacitor 12, a switching-timing controller 13, a pulse transformer 14, a rectifying section 15, a secondary-side capacitor 16, a secondary-side resistor 17, and a field effect transistor (FET) 18. FIG. 1 also shows a DC power supply PS and a receiver RE which are connected to the pulse signal output circuit 10.

The DC power supply PS is a power supply for supplying current required for the pulse signal output circuit 10 to generate a pulse signal. In the following description, voltage according to the current which the DC power supply PS supplies will be referred to as the voltage Vs. Further, in the following description, for ease of explanation, the DC power supply PS will be referred to as outputting the voltage Vs.

The receiver RE receives the pulse signal generated and output by the pulse signal output circuit 10, and performs processing based on the received pulse signal. Also, FIG. 1 shows a configuration in which the receiver RE receives the pulse signal output from the pulse signal output circuit 10 via a transmission line TL.

When the current is supplied from the DC power supply PS connected to the pulse signal output circuit 10, the pulse signal output circuit generates the pulse signal by switching the direction of application of the current by the switch section 11, and outputs the generated pulse signal to the receiver RE. The pulse signal output circuit 10 can be used in, for example, a field device which is installed at a processing site for transmitting a process quantity such as a flow rate measured at the installation position by a pulse signal. Also, in the case where the pulse signal output circuit 10 is used in a field device, as the DC power supply PS. a power supply for supplying current which is, for example, in a range between 4 mA and 20 mA and is generated from a DC analog signal such that the field device can use the current to transmit the measured process value may be used. Also, in the case where the pulse signal output circuit 10 is used in a field device, for example, the receiver RE may include a pulse counter for counting the number of pulse signals which are received and outputting information based on the count value indicating the number of received pulse signals, as information on the measured process quantity.

The pulse transformer 14 has one coil on the primary side and has one coil on the secondary side. The pulse transformer 14 is excited by current applied to the coil provided on the primary side (hereinafter, referred to as the primary coil), whereby voltage based on the voltage between both terminals of the primary coil is induced between both terminals of the coil provided on the secondary side (hereinafter, referred to as the secondary coil).

In FIG. 1, black circles shown next to the coils included in the pulse transformer 14 indicate the first-turn positions of the wires of the coils, respectively. In FIG. 1, the first-turn positions of the wires of the coils included in the pulse transformer 14 (the positions of the black circles) are on the same side. Therefore, in the pulse transformer 14, the turning direction of the wires of the coils are the same. In the following description, the first turn of the wire of the primary coil of the pulse transformer 14 will be referred to as the first terminal A1, and the last turn of the wire will be referred to as the second terminal B1. Also, the first turn of the wire of the secondary coil of the pulse transformer 14 will be referred to as the first terminal A2, and the last turn of the wire will be referred to as the second terminal B2.

The primary-side circuit and secondary-side circuit of the pulse signal output circuit 10 are insulated from each other in direct-current wise by the pulse transformer 14. When the current is supplied from the DC power supply PS connected to the pulse signal output circuit 10, the primary-side circuit of the pulse signal output circuit applies the current to the primary coil of the pulse transformer 14. As a result, in the pulse signal output circuit 10, between the first terminal A2 and second terminal B2 of the secondary coil of the pulse transformer 14, voltage based on the voltage between the first terminal A1 and second terminal B1 of the primary coil is induced. Then, the secondary-side circuit of the pulse signal output circuit 10 rectifies the current flowing in the secondary coil of the pulse transformer 14, and generates a pulse signal based on voltage based on the rectified current, and outputs the generated pulse signal to the receiver RE.

In FIG. 1, the current which the primary-side circuit applies to the primary coil of the pulse transformer 14 is shown as primary-side current i1, and the voltage between the first terminal A1 and second terminal B1 of the primary coil of the pulse transformer 14 is shown as primary-side voltage V1. Further, in FIG. 1, the voltage between the first terminal A2 and second terminal B2 of the secondary coil of the pulse transformer 14 is shown as secondary-side voltage V2, and the current which flows according to the secondary-side voltage V2 is shown as secondary-side current i2. Furthermore, in FIG. 1, the current into which the secondary-side current i2 flowing along the secondary coil of the pulse transformer 14 is rectified and flows in the secondary-side circuit is shown as rectified current i3, and voltage according to the rectified current i3 is shown as rectified voltage V3.

The primary-side circuit of the pulse signal output circuit 10 is composed of the switch section 11, the primary-side capacitor 12, the switching-timing controller 13, and the primary coil of the pulse transformer 14. In the primary-side circuit of the pulse signal output circuit 10, the first terminal A1 of the primary coil of the pulse transformer 14 is connected to a first output terminal of the switch section 11. Further, the second terminal B1 of the primary coil of the pulse transformer 14 is connected to a first terminal of the primary-side capacitor 12. Furthermore, a second terminal of the primary-side capacitor 12 is connected to a second output terminal of the switch section 11.

The primary-side capacitor 12 makes the primary-side current i1 flow in the primary-side circuit of the pulse signal output circuit 10 for a short time. Also, in the case where the pulse signal output circuit 10 is used in a field device, if the field device satisfies an explosion prevention standard, the primary-side capacitor 12 serves as an explosion prevention circuit.

When the current is supplied from the DC power supply PS connected to the input terminal of the switch section 11, the switch section switches the direction of application of the current such that the primary-side current i1 is applied in the switched direction between the first output terminal and the second output terminal. The switch section 11 has a switch S1, a switch S2, a switch S3, and a switch S4. According to control signals output from the switching-timing controller 13, each of the switch S1, the switch S2, the switch S3, and the switch S4 of the switch section 11 is switched between the ON state in which the first terminal and second terminal are short-circuited and the OFF state in which the first terminal and second terminal are opened, whereby the direction of the primary-side current i1 to be applied between the first output terminal and the second output terminal is switched. Also, in the following description, in the case where the switch S1, the switch S2, the switch S3, and the switch S4 included in the switch section 11 do not need to be distinguished, they will be referred to as the switches S.

In the switch section 11, the first terminal of the switch S1 and the first terminal of the switch S3 are connected, and this connection point serves as the input terminal of the switch section 11, and is connected to the positive terminal (DC voltage output terminal) of the DC power supply PS. Further, in the switch section 11, the second terminal of the switch S1 and the first terminal of the switch S2 are connected, and this connection point serves as the first output terminal of the switch section 11, and is connected to the first terminal A1 of the primary coil of the pulse transformer 14. Furthermore, in the switch section 11, the second terminal of the switch S3 and the first terminal of the switch S4 are connected, and this connection point serves as the second output terminal of the switch section 11, and is connected to a second terminal of the primary-side capacitor 12. Moreover, in the switch section 11, to the second terminal of the switch S2 and the second terminal of the switch S4, reference voltage for the primary-side circuit is applied. The reference voltage for the primary-side circuit is also applied to one terminal of the DC power supply PS. Also, in the switch section 11, to the control terminal of each of the switch S1, the switch S2, the switch S3, and the switch S4, a corresponding on of the control signals output from the switching-timing controller 13 is applied. More specifically, in the switch section 11, to the control terminals of the switch S1 and the switch S4, a control signal CP output from the switching-timing controller 13 is applied, and to the control terminals of the switch S2 and the switch S3, a control signal CN output from the switching-timing controller 13 is applied. In the following description, in the case where the control signal CP and the control signal CN which are output from the switching-timing controller 13 and are input to the control terminals of the switches S do not need to be distinguished, they will be referred to as the control signals C.

The switching-timing controller 13 controls the individual switches S included in the switch section 11. In the switching-timing controller 13, a time indicating a timing to switch the individual switches S included in the switch section 11 is set in advance. The switching-timing controller 13 includes, for example, a timer circuit, or a clock circuit provided in a processor such as a central processing unit (CPU) and using a timer function and the like, and when the measured time becomes the preset time, the switching-timing controller outputs each of the control signals C for switching the ON/OFF states of the switches S included in the switch section 11, to corresponding switches S. More specifically, the switching-timing controller 13 outputs the control signal CP for switching the switch S1 and the switch S4 between the ON state and the OFF state at the same time and the control signal CN for switching the switch S2 and the switch S3 at the same time, to the control terminals of the switches S. The switching-timing controller 13 exclusively (complementarily) controls switching of the switch S1 and the switch S4 between the ON state and the OFF state and switching of the switch S2 and the switch S3 between the ON state and the OFF state. In other words, the switching-timing controller 13 switches off the switch S2 and the switch S3 when switching on the switch S1 and the switch S4, and switches off the switch S1 and the switch S4 when switching on the switch S2 and the switch S3. In this way, in the primary-side circuit of the pulse signal output circuit 10, the individual switches S included in the switch section 11 are switched between the ON state and the OFF state, whereby the direction of application of the current which has been supplied from the DC power supply PS connected to the switch section 11 and will flow as the primary-side current i1 in the primary coil of the pulse transformer 14 is switched. Therefore, the direction of the primary-side current i1 is reversed. Timings when the switching-timing controller 13 switches the individual switches S included in the switch section 11 between the ON state and the OFF state will be described later together with the operation of the pulse signal output circuit 10.

Also, the secondary-side circuit of the pulse signal output circuit 10 is composed of the secondary coil of the pulse transformer 14, the rectifying section 15, the secondary-side capacitor 16, the secondary-side resistor 17, and the FET 18. In the secondary-side circuit of the pulse signal output circuit 10, the first terminal A2 of the secondary coil of the pulse transformer 14 is connected to a first input terminal of the rectifying section 15. Further, the second terminal B2 of the secondary coil of the pulse transformer 14 is connected to a second input terminal of the rectifying section 15. Furthermore, in the secondary-side circuit of the pulse signal output circuit 10, a first output terminal of the rectifying section 15 is connected to a first terminal of the secondary-side capacitor 16, a first terminal of the secondary-side resistor 17, and the gate terminal of the FET 18. Moreover, in the secondary-side circuit of the pulse signal output circuit 10, the drain terminal of the FET 18 serves as a first output terminal O1 of the pulse signal output circuit 10. Also, in the secondary-side circuit of the pulse signal output circuit 10, a second output terminal of the rectifying section 15 is connected to a second terminal of the secondary-side capacitor 16, a second terminal of the secondary-side resistor 17, and the source terminal (and back gate terminal) of the FET 18, and this connection point serves as a second output terminal O2 of the pulse signal output circuit 10. Also, in FIG. 1, the first output terminal O1 and second output terminal O2 of the pulse signal output circuit 10 are connected to corresponding transmission lines TL, and are connected to the receiver RE via those transmission lines TL, respectively.

The rectifying section 15 rectifies the voltage supplied between the first input terminal and the second input terminal, and supplies the rectified voltage between the first output terminal and the second output terminal. In other words, the rectifying section 15 supplies the rectified voltage between the gate terminal and source terminal of the FET 18 and between the terminals of each of the secondary-side capacitor 16 and the secondary-side resistor 17. The rectifying section 15 has a diode D1, a diode D2, a diode D3, and a diode D4. The rectifying section 15 is a bridge rectifier circuit having a bridge circuit composed of the diode D2, the diode D3, and the diode D4, and performs full-wave rectification on the voltage supplied between the first input terminal and the second input terminal, and supplies the rectified voltage between the first output terminal and the second output terminal by the bridge circuit. In the following description, in the case where the diode D1, the diode D2, the diode D3, and the diode D4 included in the rectifying section 15 do not need to be distinguished, they will be referred to as the diodes D.

In the rectifying section 15, the anode terminal of the diode D1 and the cathode terminal of the diode D3 are connected, and this connection point serves as the first input terminal of the rectifying section 15, and is connected to the first terminal A2 of the secondary coil of the pulse transformer 14. Further, in the rectifying section 15, the anode terminal of the diode D2 and the cathode terminal of the diode D4 are connected, and this connection point serves as the second input terminal of the rectifying section 15, and is connected to the second terminal B2 of the secondary coil of the pulse transformer 14. Furthermore, in the rectifying section 15, the cathode terminal of the diode D1 and the cathode terminal of the diode D2 are connected, and this connection point serves as the first output terminal of the rectifying section 15, and is connected to the first terminal of the secondary-side capacitor 16, the first terminal of the secondary-side resistor 17, and the gate terminal of the FET 18. Also, in the rectifying section 15, the anode terminal of the diode D3 and the anode terminal of the diode D4 are connected, and this connection point serves as the second output terminal of the rectifying section 15, and is connected to the second terminal of the secondary-side capacitor 16, the second terminal of the secondary-side resistor 17, and the source terminal of the FET 18, and this connection point serves as the second output terminal O2 of the pulse signal output circuit 10.

The secondary-side capacitor 16 is charged with the rectified voltage V3 supplied between the first terminal and the second terminal, i.e. charge according to the rectified voltage V3 is stored. In other words, the secondary-side capacitor 16 is charged with the rectified current i3 flowing between the first terminal and the second terminal.

The secondary-side resistor 17 plays a roll in releasing the charge stored in the secondary-side capacitor 16.

In the pulse signal output circuit 10, by the configuration of the secondary-side capacitor 16 and the secondary-side resistor 17, voltage is applied between the gate terminal and source terminal of the FET 18. In other words, in the pulse signal output circuit 10, even if supply of the rectified voltage from the rectifying section 15 stops, the potential between the gate terminal and source terminal of the FET 18 is maintained for a time depending on the capacitance value of the secondary-side capacitor 16 and the resistance value of the secondary-side resistor 17.

The FET 18 is switched between the ON state (the drain terminal and the source terminal are connected) and the OFF state (the drain terminal and the source terminal are disconnected) according to the rectified voltage V3 which is applied between the gate terminal and the source terminal, thereby generating a pulse signal. The pulse signal generated by the FET 18 is transmitted to the receiver RE via the transmission lines TL. The receiver RE recognizes the pulse signal at the low level when the FET 18 is in the ON state, and recognizes the pulse signal at the high level when the FET 18 is in the OFF state. More specifically, according to the rectified voltage V3 which is applied to the gate terminal, the FET 18 controls the flow of the current supplied from the receiver RE, resulting in a resistor (not shown in the drawings) provided on a transmission line TL, which is transmitted as the pulse signal to the receiver RE. As the pulse signal, for example, a signal indicating the voltage on the resistor which is high in a state where the FET 18 is on (hereinafter, referred to as the ON state) and is low in a state where the FET 18 is off (hereinafter, referred to as the OFF state) is transmitted as the pulse signal to the receiver RE. However, in the following description, for ease of explanation, the FET 18 will be referred to as generating the pulse signal and transmitting it.

According to this configuration, the pulse signal output circuit 10 switches the direction of application of the current, which has been supplied from the DC power supply PS connected to the primary-side circuit and will flow as the primary-side current i1, by the switch section 11, thereby generating the pulse signal, and outputs the generated pulse signal to the receiver RE.

In the following description, the direction of application of the primary-side current i1 from the first terminal A1 of the primary coil of the pulse transformer 14 to the second terminal B1 will be referred to as the positive direction, and the direction of application of the primary-side current i1 from the second terminal B1 to the first terminal A1 will be referred to as the negative direction. The direction of each of the primary-side current i1 and the secondary-side current i2 shown in FIG. 1 indicates the positive direction.

Figure 2:
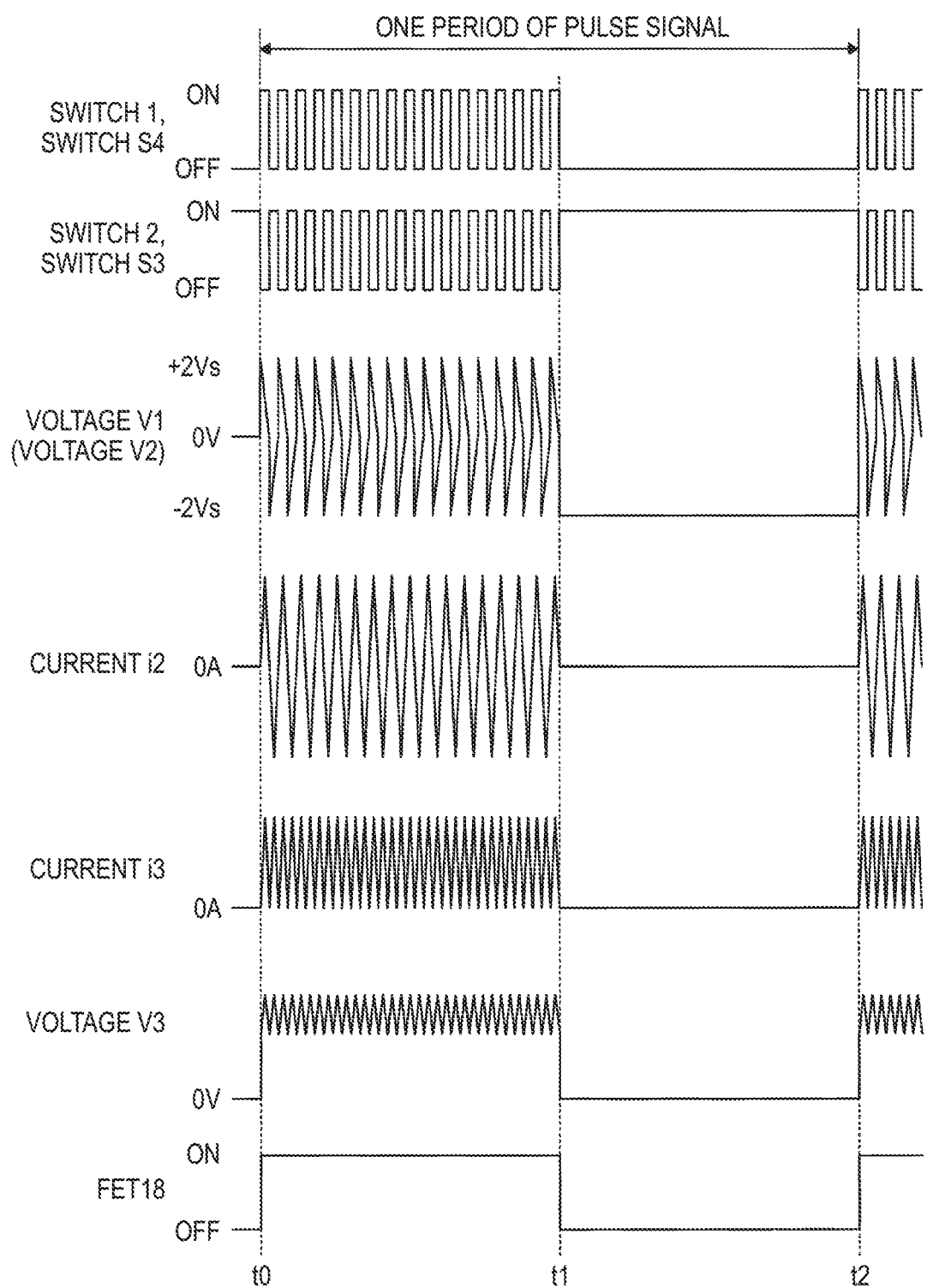
FIG. 2 is a waveform diagram for explaining the operation of the whole of the pulse signal output circuit of the first embodiment of the present invention.

Now, the operation of the pulse signal output circuit 10 will be described. First, the operation of the whole of the pulse signal output circuit 10 for generating the pulse signal and outputting the pulse signal will be described. FIG. 2 is a waveform diagrams for explaining an example of the operation of the whole of the pulse signal output circuit 10 of the first embodiment of the present invention. The example of the operation of the whole of the pulse signal output circuit 10 shown in FIG. 2 is an example of the case where the pulse signal output circuit 10 generates one period of the pulse signal. FIG. 2 schematically shows the waveforms (signals) and levels of the ON/OFF states of the individual switches S included in the switch section 11, the primary-side voltage V1 of the primary coil of the pulse transformer 14, the secondary-side current i2 which flows according to the secondary-side voltage V2 which is induced on the secondary coil of the pulse transformer 14, the rectified current i3 which is obtained by full-wave rectification of the rectifying section 15, the rectified voltage V3 according to the rectified current i3, and the ON/OFF state of the FET 18.

The pulse transformer 14 included in the pulse signal output circuit 10 is excited by the primary-side current i1 flowing in the primary coil, whereby the secondary-side voltage V2 attributable to the primary-side voltage V1 which is applied between the first terminal A1 and second terminal B1 of the primary coil is induced between the first terminal A2 and second terminal B2 of the secondary coil. Therefore, it can be said that the waveform of the primary-side voltage V1 of the primary coil shown in FIG. 2 is the same as the waveform of the secondary-side voltage V2 which is induced on the secondary coil of the pulse transformer 14, although they are different in voltage value. Therefore, in the following description, the waveform of the primary-side voltage V1 of the primary coil of the pulse transformer 14 and the waveform of the secondary-side voltage V2 of the secondary coil will be appropriately referred to in place of each other.

In the period between a timing t0 and a timing t1, the switching-timing controller 13 controls the switches S included in the switch section 11 by the control signals C such that each switch is alternately switched between the ON state and the OFF state, thereby causing the pulse signal output circuit 10 to output the pulse signal at the low level. FIG. 2 shows the way in which the switching-timing controller 13 alternately switches the control signal CP and the control signal CN, thereby switching the individual switches S between the ON state and the OFF state, from the timing t0 when one pulse signal period starts. Hereinafter, the operation of generating one period of the pulse signal will be described with switching of the control signals C by the switching-timing controller 13.

At the timing t0, the switching-timing controller 13 switches the switch S1 and the switch S4 from the OFF state to the ON state by the control signal CP, and switches the switch S2 and the switch S3 from the ON state to the OFF state by the control signal CN. As a result, the voltage Vs output from the DC power supply PS is applied to the primary-side circuit of the pulse signal output circuit 10, and the primary-side current i1 flows in the positive direction. In other words, in the primary-side circuit of the pulse signal output circuit 10, the primary-side current i1 flows along the switch S1 included in the switch section 11, the primary coil of the pulse transformer 14 (from the first terminal A1 to the second terminal B1), the primary-side capacitor 12, and the switch S4 included in the switch section 11. Therefore, as the primary-side voltage V1, voltage having a voltage value of +2Vs is applied to the primary coil of the pulse transformer 14. Thereafter, the switching-timing controller 13 switches the switch S1 and the switch S4 from the ON state to the OFF state by the control signal CP, and switches the switch S2 and the switch S3 from the OFF state to the ON state by the control signal CN. Therefore, the voltage output from the DC power supply PS is applied to the primary-side circuit of the pulse signal output circuit 10, and the primary-side current i1 flows in the negative direction. In other words, in the primary-side circuit of the pulse signal output circuit 10, the primary-side current i1 flows along the switch S3 included in the switch section 11, the primary-side capacitor 12, the primary coil of the pulse transformer 14 (from the second terminal B1 to the first terminal A1), and the switch S2 included in the switch section 11. Therefore, as the primary-side voltage V1, voltage having a voltage value of −2Vs is applied to the primary coil of the pulse transformer 14.

In this case, in the pulse signal output circuit 10, the secondary-side voltage V2 attributable to the primary-side voltage V1 is induced on the secondary coil of the pulse transformer 14, and the secondary-side current i2 according to the secondary-side voltage V2 flows in the secondary coil. Further, in the pulse signal output circuit 10, the rectifying section 15 performs full-wave rectification on the secondary-side current i2 according to the secondary-side voltage V2 induced on the secondary coil of the pulse transformer 14. As a result, in the pulse signal output circuit 10, as shown in FIG. 2, the rectified current i3 obtained by full-wave rectification of the rectifying section 15 flows in one direction, and the rectified voltage V3 according to the rectified current i3 becomes unidirectional voltage. In the pulse signal output circuit 10, the rectified voltage V3 according to the rectified current i3 obtained by full-wave rectification of the rectifying section 15 is applied between the terminals of the secondary-side capacitor 16, between the terminals of the secondary-side resistor 17, and between the gate terminal and source terminal of the FET. As a result, in the pulse signal output circuit 10, the secondary-side capacitor 16 is charged with the rectified current i3. Also, in the pulse signal output circuit 10, the FET 18 is switched on by the rectified voltage V3 applied between the gate terminal and the source terminal, whereby the pulse signal to be output transitions to the low level.

Also, in the pulse signal output circuit 10, as shown in FIG. 2, the voltage value of the primary-side voltage V1 changes between the voltage value of +2Vs and the voltage value of −2Vs according to switching of the switches S. For this reason, in the pulse signal output circuit 10, the secondary-side voltage V2 which is induced on the secondary coil of the pulse transformer 14 according to the primary-side voltage V1 also changes similarly to the primary-side voltage V1. Therefore, in the pulse signal output circuit 10, the secondary-side current i2 which flows in the secondary coil of the pulse transformer 14 temporally changes to higher current at each timing when the voltage value of the secondary-side voltage V2 changes from a positive voltage value to a negative voltage value. As can be seen from FIG. 2, the timings when the secondary-side current i2 in the pulse signal output circuit 10 temporally increases to a high current are the timings immediately after the ON/OFF states of the individual switches S are switched. However, if the voltage value of the secondary-side voltage V2 is stabilized, the secondary-side current i2 decreases and appears soon. FIG. 2 shows the way in which the secondary-side current i2 changes.

In the pulse signal output circuit 10, as shown in FIG. 2, if the secondary-side current i2 becomes 0 A, the current value of the rectified current i3 obtained by full-wave rectification of the rectifying section 15 also becomes 0 A. Therefore, in the pulse signal output circuit 10, the rectified voltage V3 according to the rectified current i3 decreases. By the way, in the pulse signal output circuit 10, the secondary-side capacitor 16 is charged with the rectified current i3. For this reason, in the pulse signal output circuit 10, if the amount of rectified current i3 which is obtained by full-wave rectification of the rectifying section 15 becomes zero (the current value becomes 0 A), by the configuration of the secondary-side capacitor 16 and the secondary-side resistor 17, the secondary-side capacitor 16 releases the stored charge. Therefore, in the pulse signal output circuit 10, even if the rectified current i3 which is obtained by full-wave rectification of the rectifying section 15 becomes 0 A, as shown in FIG. 2, the rectified voltage V3 between the gate terminal and source terminal of the FET 18 is maintained at such a voltage value that it is possible to keep the FET in the ON state, and the pulse signal to be output also is maintained at the low level.

Meanwhile, in the period between the timing t1 and a timing t2, the switching-timing controller 13 controls the switches S included in the switch section 11 by the control signals C such that the switches are maintained in their ON/OFF states, thereby causing the pulse signal output circuit 10 to output the pulse signal at the high level. FIG. 2 shows the way in which the switching-timing controller 13 controls the control signal CP and the control signal CN, thereby causing the ON/OFF states of the switches S to be maintained, from the timing t1 in one pulse signal period.

More specifically, at the timing t1, the switching-timing controller 13 switches off the switch S1 and the switch S4 by the control signal CP, and switches on the switch S2 and the switch S3 by the control signal CN. Therefore, the voltage Vs which is output from the DC power supply PS is applied to the primary-side circuit of the pulse signal output circuit 10, and the primary-side current i1 keeps flowing in the negative direction. In other words, in the primary-side circuit of the pulse signal output circuit 10, the primary-side current i1 keeps flowing along the switch S3 included in the switch section 11, the primary-side capacitor 12, the primary coil of the pulse transformer 14 (from the second terminal B1 to the first terminal A1), and the switch S2 included in the switch section 11. Therefore, the primary-side voltage V1 having a voltage value of −2Vs keeps being applied to the primary coil of the pulse transformer 14. In other words, the state where the primary-side voltage V1 which is applied to the primary coil of the pulse transformer 14 is fixed at the voltage value of −2Vs without changing.

Therefore, in the pulse signal output circuit 10, the secondary-side voltage V2 attributable to the primary-side voltage V1 is induced on the secondary coil of the pulse transformer 14. At this time, as shown in FIG. 2, the primary-side voltage V1 is kept constant at the voltage value of −2Vs. Therefore, in the pulse signal output circuit 10, the voltage value of the secondary-side voltage V2 which is induced on the secondary coil of the pulse transformer 14 according to the primary-side voltage V1 also is kept constant, similarly to the primary-side voltage V1. In the pulse signal output circuit 10, at the timing t1 when the voltage value of the secondary-side voltage V2 changes from the positive voltage value to the negative voltage value, the secondary-side current i2 flowing in the secondary coil of the pulse transformer 14 temporally changes to high current, and thereafter, if the voltage value of the secondary-side voltage V2 is stabilized, the secondary-side current decreases and appears soon.

Also, in the pulse signal output circuit 10, if all of the charge stored in the secondary-side capacitor 16 with the rectified current i3 is released in the period between the timing t0 and the timing t1 such that the pulse signal output circuit 10 outputs the pulse signal at the low level, the current value of the rectified current i3 which is obtained by performing full-wave rectification on the secondary-side current i2 in the rectifying section 15, and the voltage value of the rectified voltage V3 according to the rectified current i3 are maintained at 0 A and 0 V, respectively. Therefore, in the pulse signal output circuit 10, the FET 18 is switched on by the rectified voltage V3 with the voltage value of 0 V applied between the gate terminal and the source terminal, and the pulse signal to be output transitions to the high level.

In this way, in the pulse signal output circuit 10, the switching-timing controller 13 controls (switches) the ON/OFF states of the individual switches S included in the switch section 11 connected to the DC power supply PS, thereby switching on and off the FET 18 such that the FET generates the pulse signal and outputs it. FIG. 2 shows that at the timing t2, the pulse signal output circuit 10 starts to output the pulse signal at the low level again.

Also, in the pulse signal output circuit 10, the primary-side circuit includes the primary-side capacitor 12. For this reason, in the pulse signal output circuit 10, the primary-side voltage V1 which is applied to the primary coil of the pulse transformer 14 according to the primary-side current i1 which flows according to the control of the switching-timing controller 13 on the individual switches S included in the switch section 11 oscillates due to series resonance of the primary coil of the pulse transformer 14 and the primary-side capacitor 12 (such oscillation is called ringing). For this reason, if timings to switch the switches S included in the switch section 11 in the pulse signal output circuit 10, i.e. timings to reverse the direction of application of the primary-side current i1 to the primary coil of the pulse transformer 14 are not considered, the primary-side voltage V1 may change to a voltage value having an absolute value smaller than that of the voltage value according to the supplied current by a value depending on oscillation attributable to the series resonance of the primary coil of the pulse transformer 14 and the primary-side capacitor 12 (see the waveform of the primary-side voltage in the primary-side circuit of the related art, shown in FIG. 12). For this reason, in view of the frequency of the primary-side voltage V1 which oscillates due to series resonance of the primary coil of the pulse transformer 14 and the primary-side capacitor 12, the switching-timing controller 13 controls timings to switch the ON/OFF states of the individual switches S included in the switch section 11.

Figure 12:
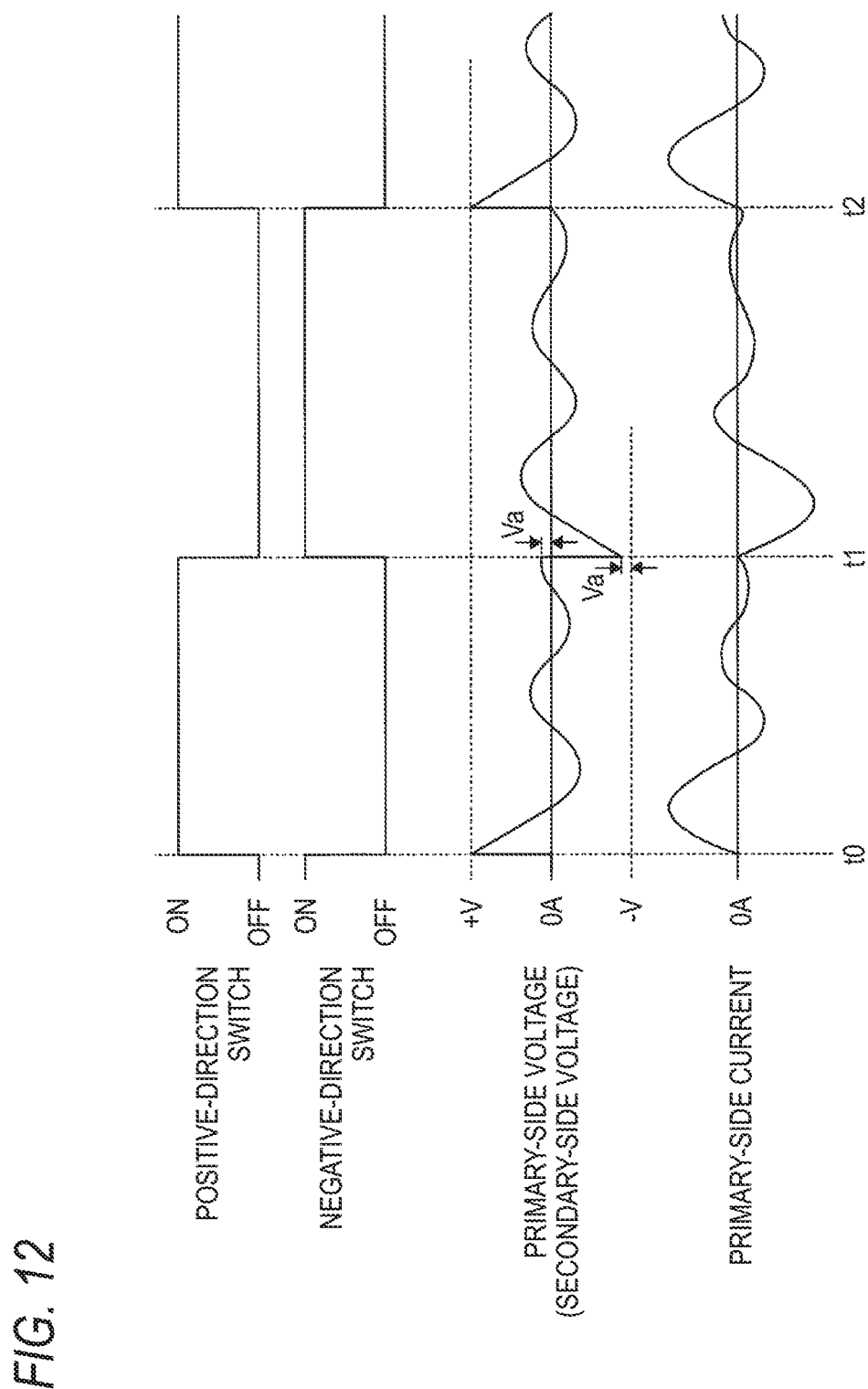
FIG. 12 is a timing chart illustrating an example of the case where the power transmission efficiency in a pulse signal output circuit of the related art decreases.

Meanwhile, in the present invention, the ON/OFF states of the switches are controlled so as to be switched at timings different from the timings in the related art shown in FIG. 12, and such a switching timing will be described. The switching-timing controller 13 switches the ON/OFF states of the individual switches S included in the switch section 11, based on the state of the primary-side voltage V1 which is oscillating. More specifically, in each switching period, the primary-side voltage V1 which is applied to the primary coil of the pulse transformer 14 starts with a certain voltage value (the voltage value at the timing t0) and oscillates. And when the primary-side voltage has a voltage value having the polarity opposite to the polarity of the voltage value at the start timing of the switching period (hereinafter, referred to as the opposite polarity), the switching-timing controller 13 switches the ON/OFF states of the individual switches S included in the switch section 11. This switching can be performed, for example, at each timing when a time preset by the switching-timing controller 13 comes.

Figure 3:
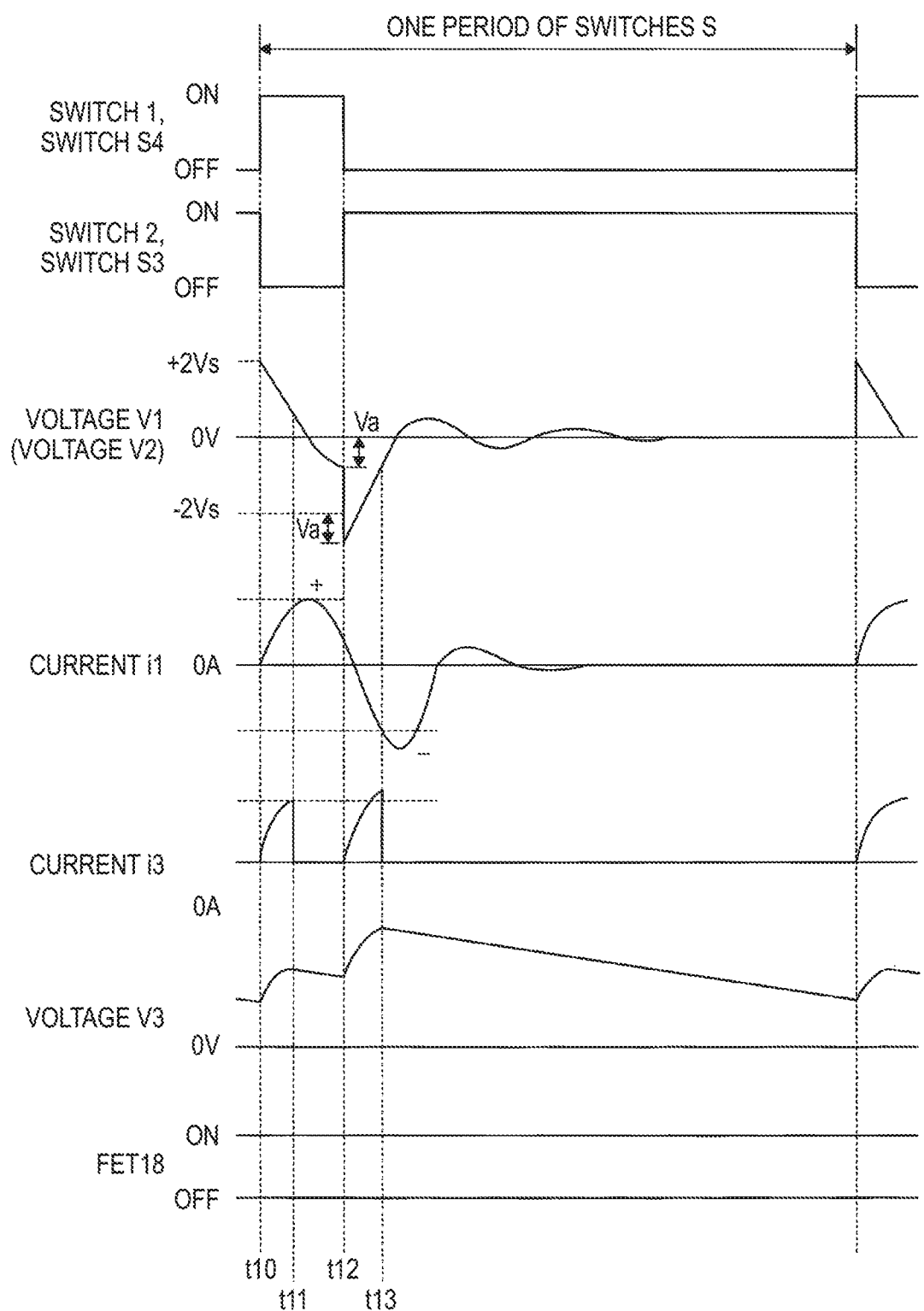
FIG. 3 is a waveform diagram for explaining an example of a timing when switches included in a switch section in the pulse signal output circuit of the first embodiment of the present invention are switched.

FIG. 3 is a waveform diagram for explaining an example of a timing when the switches S included in the switch section 11 are switched in the pulse signal output circuit 10 of the first embodiment of the present invention. The example of a timing when the switches S included in the switch section 11 are switched, shown in FIG. 3, is an example corresponding to one period in which the switching-timing controller 13 switches the ON/OFF states of the switches S such that the pulse signal output circuit 10 outputs the pulse signal at the low level. In other words, the example of a timing when the switches S included in the switch section 11 are switched, shown in FIG. 3, is an example corresponding to one period included in the period between the timing t0 and timing t1 when the sensor unit 3 alternately switches the control signals C, in the example shown in FIG. 2 for explaining the operation of the whole of the pulse signal output circuit 10. FIG. 3 also shows a part of the operation of the secondary-side circuit of the pulse signal output circuit 10. FIG. 3 schematically shows the waveforms (signals) and levels of the ON/OFF states of the individual switches S included in the switch section 11, the primary-side voltage V1 of the primary coil of the pulse transformer 14, the primary-side current i1 which is applied to the primary coil of the pulse transformer 14, the rectified current i3 which is obtained by performing full-wave rectification on the secondary-side current i2 according to the secondary-side voltage V2 induced on the secondary coil of the pulse transformer 14 in the rectifying section 15, the rectified voltage V3 according to the rectified current i3, and the ON/OFF state of the FET 18.

It also can be said that the waveform of the primary-side voltage V1 of the primary coil shown in FIG. 3 is the same as the waveform of the secondary-side voltage V2 which is induced on the secondary coil of the pulse transformer 14, similarly in the example of the operation of the whole of the pulse signal output circuit 10 shown in FIG. 2. Therefore, in the following description, similarly to the description of the example of the operation of the whole of the pulse signal output circuit 10 shown in FIG. 2, the waveform of the primary-side voltage V1 of the primary coil of the pulse transformer 14 and the waveform of the secondary-side voltage V2 of the secondary coil will be appropriately referred to in place of each other.

At a timing t10, the switching-timing controller 13 switches the switch S1 and the switch S4 from the OFF state to the ON state by the control signal CP, and switches the switch S2 and the switch S3 from the ON state to the OFF state by the control signal CN. Then, as described above, the voltage Vs which is output from the DC power supply PS is applied to the primary-side circuit of the pulse signal output circuit 10, and the primary-side current i1 flows in the positive direction along the switch S1 included in the switch section 11, the primary coil of the pulse transformer 14 (from the first terminal A1 to the second terminal B1), the primary-side capacitor 12, and the switch S4 included in the switch section 11. Therefore, as the primary-side voltage V1, the voltage having the voltage value of +2Vs is applied to the primary coil of the pulse transformer 14. However, the waveform of the primary-side voltage V1 oscillates due to a serial resonance circuit composed of the inductance component of the primary coil of the pulse transformer 14 and the primary-side capacitor 12.

At this time, as described above, the secondary-side voltage V2 attributable to the primary-side voltage V1 of the primary coil of the pulse transformer 14 is induced on the secondary coil of the pulse transformer 14. The waveform of the secondary-side voltage V2 which is induced on the secondary coil of the pulse transformer 14 also oscillates. Further, as described above, in the secondary-side circuit of the pulse signal output circuit 10, the rectified current i3 which is obtained by performing full-wave rectification on the secondary-side current i2 according to the secondary-side voltage V2 induced on the secondary coil of the pulse transformer 14 in the rectifying section 15 flows, and the rectified voltage V3 according to the rectified current i3 is applied between the terminals of the secondary-side capacitor 16, between the terminals of the secondary-side resistor 17, and between the gate terminal and source terminal of the FET. Therefore, in the pulse signal output circuit 10, the secondary-side capacitor 16 is charged with the rectified current i3, and the FET 18 is switched on by the rectified voltage V3 applied between the gate terminal and the source terminal, and the pulse signal at the low level is transmitted to the receiver RE.

Thereafter, in the pulse signal output circuit 10, the voltage value of the primary-side voltage V1 drops due to oscillation attributable to series resonance, and at a timing t11, the secondary-side voltage V2 becomes a voltage value below the forward voltage of some diodes D (more specifically, the diode D1 and the diode D4) included in the rectifying section 15, whereby the diodes D are switched off. Then, in the pulse signal output circuit 10, the current value of the rectified current i3 which is obtained by full-wave rectification of the rectifying section 15 becomes 0 A, i.e. the amount of rectified current i3 which is applied between the terminals of the secondary-side capacitor 16 and between the terminals of the secondary-side resistor 17 becomes zero. Therefore, in the pulse signal output circuit 10, the rectified voltage V3 according to the rectified current i3, i.e. the voltage between the gate terminal and source terminal of the FET 18 also stops rising. In the pulse signal output circuit 10, if the rectified current i3 which is obtained by full-wave rectification of the rectifying section 15 becomes 0 A, the charge stored in the secondary-side capacitor 16 is released by the configuration of the secondary-side capacitor 16 and the secondary-side resistor 17, such that the FET 18 is maintained in the ON state. Therefore, in the pulse signal output circuit 10, the pulse signal to be output is maintained at the low level.

Also, in the pulse signal output circuit 10, after the timing t11, the voltage value of the primary-side voltage V1 keeps decreasing. Meanwhile, in the pulse signal output circuit 10, from the timing t10, the switching-timing controller 13 starts to measure time for determining whether a preset time has elapsed. Thereafter, at a timing t12 when the measured time becomes equal to the preset time, the switching-timing controller 13 switches the switch S1 and the switch S4 from the ON state to the OFF state by the control signal CP, and switches the switch S2 and the switch S3 from the OFF state to the ON state by the control signal CN. As shown in FIG. 3, at the timing t12, the primary-side voltage V1 changes to a negative voltage value lower than the negative voltage value of −2Vs according to the supplied current by a negative voltage value −Va. Therefore, when the switching-timing controller 13 switches the individual switches S, the primary-side voltage V1 changes to a negative voltage value of −(2Vs+Va) lower than the negative voltage value according to the supplied current by the negative voltage value of −Va. In FIG. 3, the timing when the oscillation waveform of the primary-side voltage V1 has a peak having the opposite polarity for the first time is the timing t12.

As described above, in the pulse signal output circuit 10, at the timing t12, the switching-timing controller 13 switches each of the switches S; however, when the switches S are switched, the voltage value of the primary-side voltage V1 does not change to the opposite polarity. Therefore, it is possible to change the primary-side voltage to a voltage value having a larger absolute value when the individual switches S are switched as compared to, for example, the case of switching the switches when the polarity of the primary-side voltage V1 is positive (the case of the related art shown in FIG. 12) or when the voltage value of the primary-side voltage is 0 V. Therefore, in the pulse signal output circuit 10, the primary-side current i1 which is applied to the primary coil of the pulse transformer 14 and the primary-side capacitor 12 increases, and the secondary-side voltage V2 which is induced on the secondary coil of the pulse transformer 14 also increases. Therefore, in the pulse signal output circuit 10, it is possible to improve the efficiency of transmission of power from the primary coil of the pulse transformer 14 to the secondary coil. Therefore, in the pulse signal output circuit 10, the secondary-side current i2 which flows according to the secondary-side voltage V2 which is induced on the secondary coil of the pulse transformer 14, and the rectified current i3 which is obtained by full-wave rectification of the rectifying section 15 also increases, and according to the rectified current i3, the rectified voltage V3 which is applied between the terminals of the secondary-side capacitor 16, between the terminals of the secondary-side resistor 17, and between the gate terminal and source terminal of the FET 18 also increases. Therefore, in the pulse signal output circuit 10, the secondary-side capacitor 16 is charged with the larger amount of rectified current i3, and it is possible to obtain high drive voltage for the gate terminal of the FET 18.

Thereafter, in the pulse signal output circuit 10, the voltage value of the primary-side voltage V1 rises due to oscillation attributable to series resonance, and at a timing t13, the secondary-side voltage V2 becomes a voltage value below the forward voltage of some diodes D (more specifically, the diode D2 and the diode D3) included in the rectifying section 15, whereby the diodes D are switched off. Then, in the pulse signal output circuit 10, similarly in the case of the timing t11, the current value of the rectified current i3 which is obtained by full-wave rectification of the rectifying section 15 becomes 0 A, i.e. the amount of rectified current i3 which is applied between the terminals of the secondary-side capacitor 16 and between the terminals of the secondary-side resistor 17 becomes zero. Therefore, in the pulse signal output circuit 10, similarly in the case of the timing t11, the rectified voltage V3 according to the rectified current i3 (the voltage between the gate terminal and source terminal of the FET 18) also stops rising. However, in the pulse signal output circuit 10, even if the rectified current i3 which is obtained by full-wave rectification of the rectifying section 15 becomes 0 A at the timing t13, similarly in the case of the timing t11, since the charge stored in the secondary-side capacitor 16 is released by the configuration of the secondary-side capacitor 16 and the secondary-side resistor 17, the ON state of the FET 18 is maintained. Therefore, in the pulse signal output circuit 10, similarly in the case of the timing t11, the pulse signal to be output is maintained at the low level.

As described above, in the pulse signal output circuit 10, after the oscillation waveform of the primary-side voltage V1 changes to the opposite polarity, when the primary-side voltage has a voltage value having the opposite polarity, the switching-timing controller 13 switches the ON/OFF states of the individual switches S included in the switch section 11. The timing when the switching-timing controller 13 switches the ON/OFF states of the switches S may be any timing when the oscillation waveform of the primary-side voltage V1 has a voltage value having the opposite polarity. In other words, the switching timing may be a timing when the oscillation waveform of the primary-side voltage has a peak, or may be a timing after the second oscillation period of the primary-side voltage V1. However, in the pulse signal output circuit 10, in order to improve the efficiency of transmission of power from the primary coil of the pulse transformer 14 to the secondary coil, i.e. in order to cause voltage having a voltage value having a larger absolute value to be induced as the secondary-side voltage V2 on the secondary coil of the pulse transformer 14, the timing when the oscillation waveform of the primary-side voltage V1 has a peak having the opposite polarity is set as a timing when the switching-timing controller 13 switches the ON/OFF states of the switches S. Alternately, in the pulse signal output circuit 10, the timing when the oscillation waveform of the primary-side voltage V1 has the first peak having the opposite polarity is set as the timing when the switching-timing controller 13 switches the ON/OFF states of the switches S. The reason is that at the timing when the oscillation waveform of the primary-side voltage V1 has the first peak having the opposite polarity, the primary-side voltage V1 has the voltage value having the largest absolute value, of the voltage values having the opposite polarity.

In the pulse signal output circuit 10, after switching switches the ON/OFF states of the individual switches S, the switching-timing controller 13 measures the preset time, i.e. the time required for the next timing to switch the ON/OFF states of the individual switches S to come. In the example shown in FIG. 3 for explaining a timing when the switches S included in the switch section 11 are switched, the timing when the oscillation waveform of the primary-side voltage has the first peak having the opposite polarity (the timing t12) is set as the next timing to switch the ON/OFF states of the individual switches S in advance. Therefore, from the timing t10 when the ON/OFF states of the individual switches S are switched, the switching-timing controller 13 measures the preset time required for the timing when the oscillation waveform of the primary-side voltage V1 to have the first peak having the opposite polarity (the timing t12) to come. The time at which the switching-timing controller 13 measures (here, the time required for the oscillation waveform of the primary-side voltage V1 to have the first peak having the opposite polarity) can be obtained based on the condition in which the primary-side voltage V1 oscillates, and be set in advance.

More specifically, in the pulse signal output circuit 10, the frequency at which the primary-side voltage V1 oscillates (the oscillation frequency) is determined according to the inductance value of the primary coil of the pulse transformer 14 and the capacitance value of the primary-side capacitor 12, and the degree of damping of oscillation of the primary-side voltage V1 is determined according to the resistance value of each of the switches S included in the switch section 11 in the ON state and the resistance value of the primary coil. For this reason, in the pulse signal output circuit 10, based on the inductance value of the primary coil of the pulse transformer 14 and the capacitance value of the primary-side capacitor 12, the time required for the oscillation waveform of the primary-side voltage V1 to have the first peak having the opposite polarity (the time required for the oscillation waveform of the primary-side voltage to have the first peak having the opposite polarity, i.e. the time until the timing t12) can be calculated in advance, and the calculated time can be set in advance as the timing at which the switching-timing controller 13 switches the ON/OFF states of the individual switches S included in the switch section 11.

More specifically, the oscillation frequency $f_0$ of the primary-side voltage V1 can be obtained by the following Expression 1. Also, the time required for the oscillation waveform of the primary-side voltage V1 to have the first peak having the opposite polarity (the time from the timing t10 to the timing t12) is the time corresponding to ¼ of the oscillation period of the primary-side voltage V1 which can be obtained from the oscillation frequency $f_0$ of the primary-side voltage V1. Therefore, in the pulse signal output circuit 10, the time required for the oscillation waveform of the primary-side voltage V1 to have the first peak having the opposite polarity is calculated by the following Expression 2, as a switching time T when the switching-timing controller 13 switches the ON/OFF states of the individual switches S.

[Expression 1]

$$f_0 = \frac{1}{2 \cdot \pi \cdot \sqrt{L \cdot C}} \quad (1)$$

[Expression 2]

$$T = \frac{2 \cdot \pi \cdot \sqrt{L \cdot C}}{4} \quad (2)$$

In Expression 1 and Expression 2, L represents the inductance value of the primary coil of the pulse transformer 14, and C represents the capacitance value of the primary-side capacitor 12. The switching time T corresponding to ¼ of the oscillation period is calculated; however, a switching time when the primary-side voltage V1 has a voltage value having the opposite polarity (for example, a voltage value having the opposite polarity which is not a peak, or a voltage value having the opposite polarity after the second oscillation period of the primary-side voltage V1) may be calculated.

In the pulse signal output circuit 10, after switching the ON/OFF states of the individual switches S (for example, at the timing t10), the switching-timing controller 13 measures the time required for the switching time T calculated by Expression 2 to come. When the measured time reaches the switching time T (for example, the timing t12), the switching-timing controller 13 switches the ON/OFF states of the individual switches S. Therefore, in the pulse signal output circuit 10, as described above, it is possible to improve the efficiency of transmission of power from the primary coil of the pulse transformer 14 to the secondary coil. Therefore, in the pulse signal output circuit 10, it is possible to obtain high drive voltage for the gate terminal of the FET 18 for generating the pulse signal.

In FIG. 2, at the start timing of each pulse signal period (the timing t0 and the timing t2), the switching-timing controller 13 switches the switch S1 and the switch S4 from the OFF state to the ON state, and switches the switch S2 and the switch S3 from the ON state to the OFF state, such that the pulse signal output circuit 10 outputs the pulse signal. In this case, in the pulse signal output circuit 10, the primary-side current i1 is applied to the primary-side circuit of the pulse signal output circuit 10 in the order of the positive direction and the negative direction, such that the pulse signal at the low level is output. However, which of the individual switches S the switching-timing controller 13 switches on first such that the pulse signal output circuit 10 outputs a pulse signal, i.e. the order of the positive direction and the negative direction in which the primary-side current i1 is applied to the primary-side circuit of the pulse signal output circuit 10 is not limited to the order shown in FIG. 2. In other words, in the pulse signal output circuit 10, the switching-timing controller 13 may switch the switch S2 and the switch S3 from the OFF state to the ON state and switch the switch S1 and the switch S4 from the ON state to the OFF state, at the start timing of each pulse signal period. In this case, in the pulse signal output circuit 10, the primary-side current i1 is applied to the primary-side circuit of the pulse signal output circuit 10 in the order of the negative direction and the positive direction. Even in this case, the pulse signal output circuit 10 can output the pulse signal at the low level.

Now, the operation of the pulse signal output circuit 10 in the case of applying the primary-side current i1 to the primary-side circuit in the order of the negative direction and the positive direction will be described. Even in the case of applying the primary-side current i1 flows to the primary-side circuit of the pulse signal output circuit 10 in the order of the negative direction and the positive direction, based on the state of the primary-side voltage V1 which is oscillating, at a preset time after the oscillation waveform of the primary-side voltage V1 changes to the opposite polarity, the switching-timing controller 13 switches the ON/OFF states of the individual switches S included in the switch section 11. The operation of the whole of the pulse signal output circuit 10 in this case can be easily supposed by reversing the polarities of the waveforms of the ON/OFF states of the individual switches S, the primary-side voltage V1 of the primary coil of the pulse transformer 14 (the secondary-side voltage V2 of the secondary coil of the pulse transformer 14), and the secondary-side current i2 which flows in the secondary coil of the pulse transformer 14, in the operation of the whole of the pulse signal output circuit 10 shown in FIG. 2. Therefore, a detailed description of the operation of the whole of the pulse signal output circuit 10 in the case of applying the primary-side current i1 to the primary-side circuit of the pulse signal output circuit 10 in the order of the negative direction and the positive direction will not be made, and only a timing in this case (a timing in one period of the switches) when the switching-timing controller 13 switches the ON/OFF states of the individual switches S included in the switch section 11 will be described with reference to FIG. 4.

Figure 4:
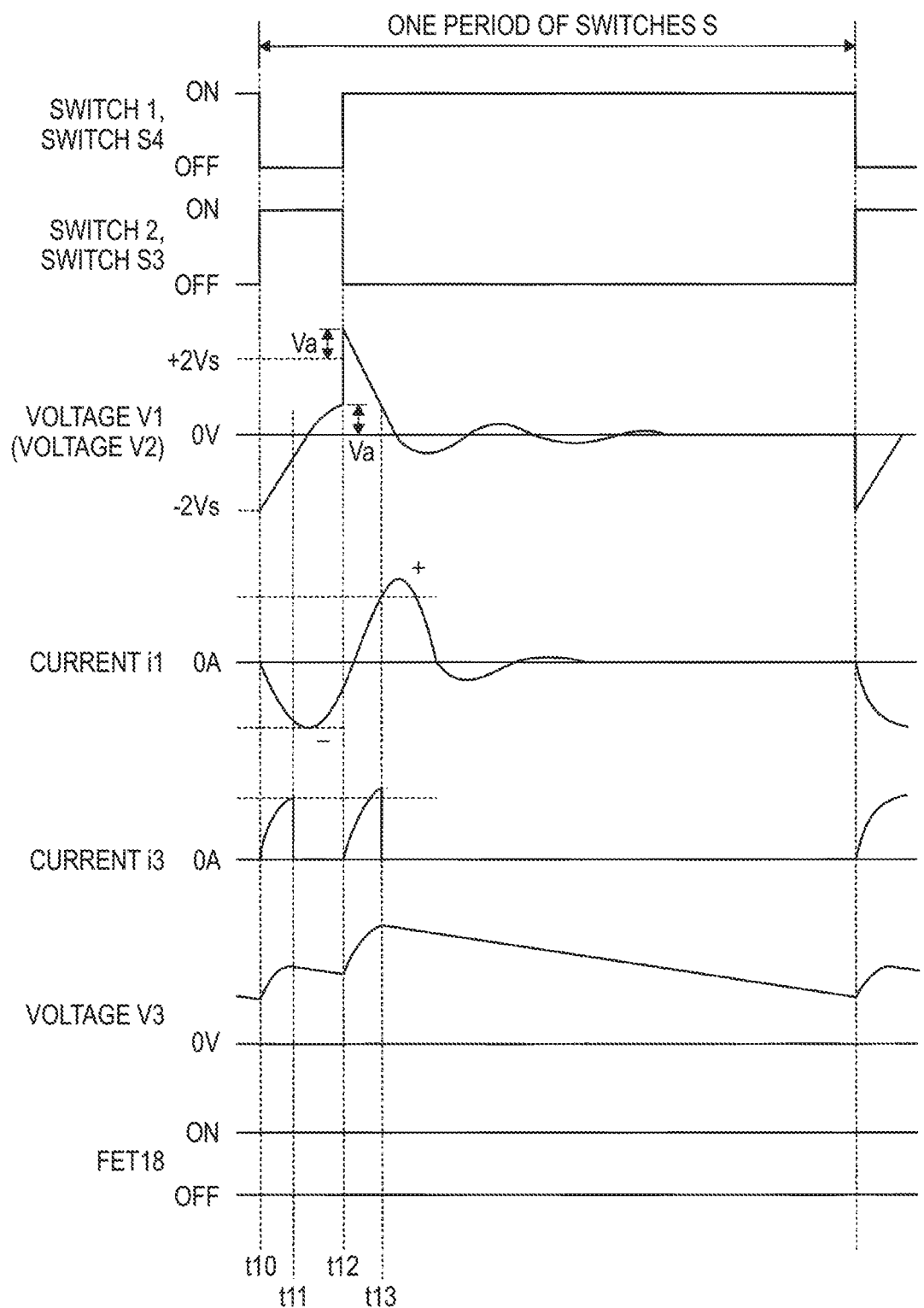
FIG. 4 is a waveform diagram for explaining another example of a timing when the switches included in the switch section in the pulse signal output circuit of the first embodiment of the present invention are switched.

FIG. 4 is a waveform diagram for explaining another example of a timing when the switches S included in the switch section 11 are switched in the pulse signal output circuit 10 of the first embodiment of the present invention. The example a timing when the switches S included in the switch section 11 are switched, shown in FIG. 4, is an example of the case where the switching-timing controller 13 switches the ON/OFF states of the individual switches S, thereby applying the primary-side current i1 to the primary-side circuit of the pulse signal output circuit 10 in the order of the negative direction and the positive direction, such that the pulse signal output circuit 10 outputs the pulse signal at the low level. Similarly to the example of a timing when the switches S included in the switch section 11 are switched, shown in FIG. 3, the example of a timing when the switches S included in the switch section 11 are switched, shown in FIG. 4, is also an example corresponding to one period in which the switching-timing controller 13 switches the ON/OFF states of the switches S such that the pulse signal output circuit 10 outputs the pulse signal at the low level. Similarly to FIG. 3 showing the example of a timing when the switches S included in the switch section 11 are switched, FIG. 4 also shows a part of the operation of the secondary-side circuit of the pulse signal output circuit 10. FIG. 4 also schematically shows the waveforms (signals) and levels of the ON/OFF states of the individual switches S included in the switch section 11, the primary-side voltage V1 of the primary coil of the pulse transformer 14, the primary-side current i1 which is applied to the primary coil of the pulse transformer 14, the rectified current i3 which is obtained by performing full-wave rectification on the secondary-side current i2 according to the secondary-side voltage V2 induced on the secondary coil of the pulse transformer 14 in the rectifying section 15, the rectified voltage V3 according to the rectified current i3, and the ON/OFF state of the FET 18.

Further, similarly in the example of a timing when the switches S included in the switch section 11 are switched, shown in FIG. 3, it can be said that the waveform of the primary-side voltage V1 of the primary coil shown in FIG. 4 is the same as the waveform of the secondary-side voltage V2 which is induced on the secondary coil of the pulse transformer 14. Therefore, in the following description, similarly to the example of a timing when the switches S included in the switch section 11 are switched, shown in FIG. 3, the waveform of the primary-side voltage V1 of the primary coil of the pulse transformer 14 and the waveform of the secondary-side voltage V2 of the secondary coil will be appropriately referred to in place of each other.

At a timing t10, the switching-timing controller 13 switches the switch S1 and the switch S4 from the OFF state to the ON state by the control signal CP, and switches the switch S2 and the switch S3 from the ON state to the OFF state by the control signal CN. Then, as described above, the voltage Vs which is output from the DC power supply PS is applied to the primary-side circuit of the pulse signal output circuit 10, and the primary-side current i1 flows in the negative direction along the switch S3 included in the switch section 11, the primary-side capacitor 12, the primary coil of the pulse transformer 14 (from the second terminal B1 to the first terminal A1), and the switch S2 included in the switch section 11. Therefore, the primary-side voltage V1 having the voltage value of −2Vs is applied to the primary coil of the pulse transformer 14. The waveform of the primary-side voltage V1 also oscillates due to a serial resonance circuit composed of the inductance component of the primary coil of the pulse transformer 14 and the primary-side capacitor 12. According to the primary-side voltage V1 of the primary coil of the pulse transformer 14, the waveform of the secondary-side voltage V2 which is induced on the secondary coil of the pulse transformer 14 also oscillates.

Further, as described above, in the secondary-side circuit of the pulse signal output circuit 10, the rectified current i3 which is obtained by performing full-wave rectification on the secondary-side current i2 according to the secondary-side voltage V2 induced on the secondary coil of the pulse transformer 14 in the rectifying section 15 flows. Since the rectified current i3 is obtained by full-wave rectification of the rectifying section 15, the rectified current flows in the same direction as the direction in the example of a timing when the switches S included in the switch section 11 are shown, shown in FIG. 3. In other words, in the secondary-side circuit of the pulse signal output circuit 10, the rectified current i3 flows in the same direction as the direction in the case of applying the primary-side current i1 to the order of the positive direction and the negative direction. Therefore, in the secondary-side circuit of the pulse signal output circuit 10, the rectified voltage V3 is applied between the terminals of the secondary-side capacitor 16, between the terminals of the secondary-side resistor 17, and between the gate terminal and source terminal of the FET in the same direction as the direction in the case of applying the primary-side current i1 in the order of the positive direction and the negative direction. Therefore, in the pulse signal output circuit 10, similarly to the case of applying the primary-side current i1 in the order of the positive direction and the negative direction, the secondary-side capacitor 16 is charged with the rectified current i3, and the FET 18 is switched on by the rectified voltage V3 between the gate terminal and the source terminal, and the pulse signal at the low level is transmitted to the receiver RE.

Thereafter, in the pulse signal output circuit 10, the voltage value of the primary-side voltage V1 rises due to oscillation attributable to series resonance, and at a timing t11, the secondary-side voltage V2 becomes a voltage value below the forward voltage of some diodes D (more specifically, the diode D2 and the diode D3) included in the rectifying section 15, whereby the diodes D are switched off. Then, in the pulse signal output circuit 10, similarly in the example of a timing when the switches S included in the switch section 11 are switched, shown in FIG. 3, the current value of the rectified current i3 which is obtained by full-wave rectification of the rectifying section 15 becomes 0 A, i.e. the amount of rectified current i3 which is applied between the terminals of the secondary-side capacitor 16 and between the terminals of the secondary-side resistor 17 becomes zero. Therefore, in the pulse signal output circuit 10, similarly in the example of a timing when the switches S included in the switch section 11 are switched, shown in FIG. 3, the rectified voltage V3 according to the rectified current i3 (the voltage between the gate terminal and source terminal of the FET 18) also stops rising. In the pulse signal output circuit 10, if the rectified current i3 which is obtained by full-wave rectification of the rectifying section 15 becomes 0 A, similarly to the case of applying the primary-side current i1 in the order of the positive direction and the negative direction, the charge stored in the secondary-side capacitor 16 is released by the configuration of the secondary-side capacitor 16 and the secondary-side resistor 17, and the FET 18 are maintained in the ON state, and the pulse signal to be output is maintained at the low level.

Meanwhile, in the pulse signal output circuit 10, the switching-timing controller 13 measures time from the timing t10 in order to determine whether it is the preset time, i.e. the switching time T. Here, the switching time T is the time calculated by the above Expression 2. At the timing t12 when the measured time reaches the switching time T, the switching-timing controller 13 switches the switch S1 and the switch S4 from the OFF state to the ON state by the control signal CP, and switches the switch S2 and the switch S3 from the ON state to the OFF state by the control signal CN. As shown in FIG. 4, the voltage value of the primary-side voltage V1 keeps increasing even after the timing t11, and at the timing t12, the primary-side voltage has a positive voltage value of Va. Therefore, when the switching-timing controller 13 switches the individual switches S, the primary-side voltage V1 changes to a positive voltage value of 2Vs+Va higher than the positive voltage value of 2Vs according to the supplied current by the positive voltage value of Va. Even in FIG. 4, similarly in the example of a timing when the switches S included in the switch section 11 are switched, shown in FIG. 3, the timing when the oscillation waveform of the primary-side voltage V1 has the first peak having the opposite polarity is denoted by the timing t12.

Thereafter, in the pulse signal output circuit 10, the voltage value of the primary-side voltage V1 drops due to oscillation attributable to series resonance, and at a timing t13, the secondary-side voltage V2 becomes a voltage value below the forward voltage of some diodes D (more specifically, the diode D1 and the diode D4) included in the rectifying section 15, whereby the diodes D are switched off. Then, in the pulse signal output circuit 10, similarly to the case of the timing t11, the current value of the rectified current i3 which is obtained by full-wave rectification of the rectifying section 15 becomes 0 A, i.e. the amount of rectified current i3 which is applied between the terminals of the secondary-side capacitor 16 and between the terminals of the secondary-side resistor 17 becomes zero, and the rectified voltage V3 according to the rectified current i3 (the voltage between the gate terminal and source terminal of the FET 18) also stops rising. However, in the pulse signal output circuit 10, even if the rectified current i3 which is obtained by full-wave rectification of the rectifying section 15 becomes 0 A at the timing t13, similarly in the case of the timing t11, the charge stored in the secondary-side capacitor 16 is released by the configuration of the secondary-side capacitor 16 and the secondary-side resistor 17, and the ON state of the FET 18 is maintained. Therefore, in the pulse signal output circuit 10, similarly in the case of the timing t11, the pulse signal to be output is maintained at the low level.

As described above, in the pulse signal output circuit 10, even in the case where the switching-timing controller 13 applies the primary-side current i1 in the order of the negative direction and the positive direction, at the timing t12, the switching-timing controller switches the individual switches S, whereby the pulse signal output circuit operates similarly in the case of the example of a timing when the switches S included in the switch section 11 are switched, shown in FIG. 3. Therefore, in the pulse signal output circuit 10, even in the case where the switching-timing controller 13 applies the primary-side current i1 in the order of the negative direction and the positive direction, it is possible to change the primary-side voltage V1 to a higher voltage value when the switches S are switched, as compared to the case of switching the switches when the polarity of the primary-side voltage V1 is negative or when the voltage value of the primary-side voltage is 0 V. Therefore, in the pulse signal output circuit 10, even in the case where the switching-timing controller 13 applies the primary-side current i1 in the order of the negative direction and the positive direction, the primary-side current i1 which flows in the primary coil of the pulse transformer 14 and the primary-side capacitor 12 is higher, and the secondary-side voltage V2 which is induced on the secondary coil of the pulse transformer 14 also is higher. Therefore, in the pulse signal output circuit 10, even in the case where the switching-timing controller 13 applies the primary-side current i1 in the order of the negative direction and the positive direction, it is possible to improve the efficiency of transmission of power from the primary coil of the pulse transformer 14 to the secondary coil. Therefore, in the pulse signal output circuit 10, even in the case where the switching-timing controller 13 applies the primary-side current i1 in the order of the negative direction and the positive direction, the secondary-side current i2 which flows according to the secondary-side voltage V2 induced on the secondary coil of the pulse transformer 14, and the rectified current i3 which obtained by full-wave rectification of the rectifying section 15 also are higher, and the rectified voltage V3 which is applied between the terminals of the secondary-side capacitor 16, between the terminals of the secondary-side resistor 17, and between the gate terminal and source terminal of the FET according to the rectified current i3 also is higher. Therefore, in the pulse signal output circuit 10, even in the case where the switching-timing controller 13 applies the primary-side current i1 in the order of the negative direction and the positive direction, the secondary-side capacitor 16 is charged with the higher rectified current i3, and it is possible to obtain high drive voltage of the gate terminal of the FET 18.

As described above, in the pulse signal output circuit 10, regardless of the direction in which the primary-side current i1 is applied for the first time (the order of the directions in which the primary-side current is applied), when the oscillation waveform of the primary-side voltage V1 has the opposite polarity, the switching-timing controller 13 switches the ON/OFF states of the individual switches S included in the switch section 11. Therefore, in the pulse signal output circuit 10, regardless of the direction in which the primary-side current i1 is applied for the first time, it is possible to improve the efficiency of transmission of power from the primary coil of the pulse transformer 14 to the secondary coil, and it is possible to obtain high drive voltage for the gate terminal of the FET 18.

Further, in the pulse signal output circuit 10, the switching-timing controller 13 switches the ON/OFF states of the individual switches S at the timing when the oscillation waveform of the primary-side voltage V1 has the first peak having the opposite polarity and the absolute voltage value of Va. Therefore, when the ON/OFF states of the individual switches S are switched, it is possible to change the primary-side voltage V1 to the opposite-polarity voltage value having the absolute value larger than that of the opposite-polarity voltage value according to the supplied current by Va. Furthermore, in the pulse signal output circuit 10, the switching-timing controller 13 measures the switching time T calculated in advance based on the inductance value of the primary coil of the pulse transformer 14 and the capacitance value of the primary-side capacitor 12 by the simple clock circuit such as a timer circuit or a CPU. Therefore, it is possible to switch the ON/OFF states of the switches S at the timing when the oscillation waveform of the primary-side voltage V1 has the first peak having the opposite polarity. Therefore, in the pulse signal output circuit 10, it is possible to improve the efficiency of transmission of power from the primary coil of the pulse transformer 14 to the secondary coil, and it is possible to obtain high drive voltage for the gate terminal of the FET 18. Therefore, in the pulse signal output circuit 10, it is possible to decrease the power consumption of the pulse signal output circuit 10, for example, by lowering the voltage Vs which the DC power supply PS outputs. Also, in the pulse signal output circuit 10, for example, it is possible to use an FET having a low threshold voltage, and it is possible to configure the rectifying section using diodes having a low forward voltage. Like this, since restrictions for components to constitute the pulse signal output circuit 10 are eased, it is possible to easily select components.

Also, in the pulse signal output circuit 10, the time (the switching time T) indicating the timing when the switching-timing controller 13 switches the ON/OFF states of the individual switches S is calculated based on the inductance value of the primary coil of the pulse transformer 14 and the capacitance value of the primary-side capacitor 12, and is set in advance. In other words, in the pulse signal output circuit 10, the time required for the oscillation waveform of the primary-side voltage V1 in the primary-side circuit of the pulse signal output circuit 10 to have the first peak having the opposite polarity is calculated in advance. Also, the case where the pulse signal output circuit 10 is configured such that the switching-timing controller 13 measures time from a timing when the ON/OFF states of the individual switches S is switched (the timing t10), and sets a timing when the measured time reaches the switching time T (the timing t12) as the next timing to switch the ON/OFF states of the individual switches S has been described. However, the pulse signal output circuit of the present invention is not limited to the configuration which determines the next timing to switch the ON/OFF states of the individual switches S by measuring the preset time, and the pulse signal output circuit of the present invention may be configured to detect the next timing to switch the ON/OFF states of the individual switches S.

Second Embodiment

Figure 5:
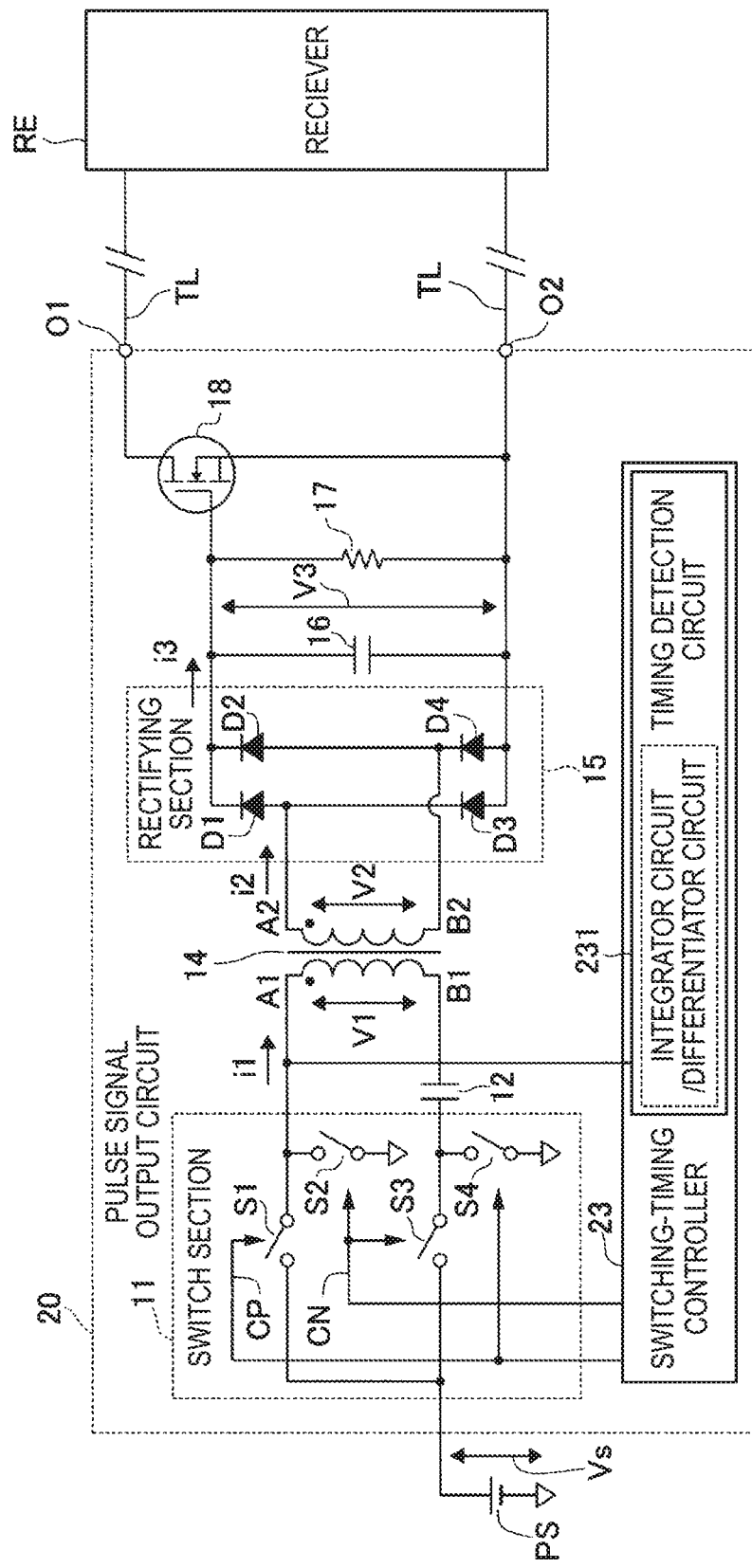
FIG. 5 is a configuration diagram illustrating the configuration of a pulse signal output circuit according to a second embodiment of the present invention.

Now, a second embodiment of the present invention will be described. FIG. 5 is a configuration diagram illustrating the configuration of a pulse signal output circuit according to a second embodiment of the present invention. A pulse signal output circuit 20 includes a switch section 11, a primary-side capacitor 12, a switching-timing controller 23, a pulse transformer 14, a rectifying section 15, a secondary-side capacitor 16, a secondary-side resistor 17, and an FET 18. Further, the switching-timing controller 23 has a timing detection circuit 231. FIG. 5 also shows a DC power supply PS and a receiver RE which are connected to the pulse signal output circuit 20.

The pulse signal output circuit 20 has the same configuration as the configuration of the pulse signal output circuit 10 of the first embodiment shown in FIG. 1 except that it has the switching-timing controller 23 in place of the switching-timing controller 13. The other components of the pulse signal output circuit 20 are identical to the components of the pulse signal output circuit 10 of the first embodiment shown in FIG. 1. Therefore, in the following description, of the components of the pulse signal output circuit 20, the components identical to the components of the pulse signal output circuit 10 of the first embodiment will be denoted by the same reference symbols, and a detailed description of those components will not be made.

Similarly to the pulse signal output circuit 10, the pulse signal output circuit 20 also generates a pulse signal by switching the direction of application of the primary-side current i1 which the current is supplied from the DC power supply PS connected to the pulse signal output circuit, by the switch section 11, thereby generating a pulse signal, and outputs the generated pulse signal to the receiver RE. Similarly to the pulse signal output circuit 10, the pulse signal output circuit 20 also can be used in, for example, a field device.

Similarly in the pulse signal output circuit 10, the primary-side circuit and secondary-side circuit of the pulse signal output circuit 20 also are insulated from each other in direct-current wise by the pulse transformer 14. Similarly in the pulse signal output circuit 10, even in the primary-side circuit of the pulse signal output circuit 20, the current supplied from the DC power supply PS connected to the pulse signal output circuit is applied as the primary-side current i1 to the primary coil of the pulse transformer 14. Therefore, similarly in the pulse signal output circuit 10, even in the pulse signal output circuit 20, the secondary-side voltage V2 attributable to the primary-side voltage V1 which is applied between the first terminal A1 and second terminal B1 of the primary coil of the pulse transformer 14 is induced between the first terminal A2 and second terminal B2 of the secondary coil. Further, similarly in the pulse signal output circuit 10, even in the secondary-side circuit of the pulse signal output circuit 20, the secondary-side current i2 which flows in the secondary coil of the pulse transformer 14 is rectified, and based on the rectified voltage V3 according to the rectified current i3 which is obtained by rectification, a pulse signal is generated, and the generated pulse signal is output to the receiver RE.

The primary-side circuit of the pulse signal output circuit 20 is composed of the switch section 11, the primary-side capacitor 12, the switching-timing controller 23, and the primary coil of the pulse transformer 14. In the primary-side circuit of the pulse signal output circuit 20, the first terminal A1 of the primary coil of the pulse transformer 14 (the first output terminal of the switch section 11) is connected to the timing detection circuit 231 included in the switching-timing controller 23. However, instead of the first terminal A1 of the primary coil of the pulse transformer 14 (the first output terminal of the switch section 11), the second terminal B1 of the primary coil of the pulse transformer 14 (the first terminal of the primary-side capacitor 12) or the second terminal of the primary-side capacitor 12 (the second output terminal of the switch section 11) may be connected to the timing detection circuit 231. The other connections in the primary-side circuit of the pulse signal output circuit 20, i.e. the other connections of the components constituting the primary-side circuit of the pulse signal output circuit 20 are the same as the connections of the components in the primary-side circuit of the pulse signal output circuit 10.

The switching-timing controller 23 controls each of the switches S included in the switch section 11, similarly to the switching-timing controller 13 included in the pulse signal output circuit 10. However, in the switching-timing controller 23, the timing detection circuit 231 detects each timing to switch the ON/OFF states of the individual switches S.

The timing detection circuit 231 acquires the voltage value of the primary-side voltage V1 which is applied to the primary coil of the pulse transformer 14, from the first terminal A1 of the primary coil of the pulse transformer 14 (the first output terminal of the switch section 11), and monitors it. Based on the voltage value of the primary-side voltage V1 acquired and monitored, the timing detection circuit 231 detects a timing to switch the ON/OFF states of the individual switches S included in the switch section 11.

As components for the timing detection circuit 231, i.e. the method usable in the timing detection circuit 231 to detect each timing to switch the ON/OFF states of the individual switches S, various components (methods) can be considered. For example, the timing detection circuit 231 may be configured with an integrator circuit. The integrator circuit can be implemented with a resistor and a capacitor. In this case, the timing detection circuit 231 performs the integral (summing) of the voltage value of the primary-side voltage V1, and detects a timing to switch the ON/OFF states of the individual switches S, based on the value of integral. More specifically, the timing detection circuit 231 performs the integral (summing) of the voltage value of the input primary-side voltage V1 alternating between both polarities, i.e. between the positive polarity and the negative polarity. Also, the timing detection circuit 231 detects a timing when the value of integral (sum) of the voltage value of the primary-side voltage V1 is 0 (for example, the output voltage of the integrator circuit is 0 V). The timing when the value of integral of the voltage value of the primary-side voltage V1 is 0 can be considered as a timing very close to a timing when the oscillation waveform of the primary-side voltage V1 which is oscillating due to series resonance of the inductance component of the primary side of the pulse transformer and the primary-side capacitor has a peak having the opposite polarity. Since the timing detection circuit 231 detects a timing when the value of integral is 0, it is considered that, for example, even if the oscillation waveform of the primary-side voltage V1 varies, it is possible to detect a timing very close to a timing when the oscillation waveform has a peak having the opposite polarity, as a timing to switch the ON/OFF states of the individual switches S.

Alternatively, for example, the timing detection circuit 231 may be configured with a differentiator circuit. The differentiator circuit can be implemented with a capacitor and a resistor. In this case, the timing detection circuit 231 performs differentiation of the voltage value of the input primary-side voltage V1 which is monitored, thereby detecting a timing to switch the ON/OFF states of the individual switches S. More specifically, the timing detection circuit 231 performs differentiation of the voltage value of the primary-side voltage V1 alternating between both polarities, thereby obtaining the slope of the oscillation waveform of the primary-side voltage V1. Also, the timing detection circuit 231 detects a timing when the slope of the oscillation waveform of the primary-side voltage V1 obtained by performing differentiation of the voltage value of the primary-side voltage V1 is 0 (for example, the output voltage of the differentiator circuit is 0 V). The timing when the slope of the oscillation waveform of the primary-side voltage V1 is 0 can be considered as a timing very close to a timing when the oscillation waveform of the primary-side voltage V1 which is oscillating has a peak having the opposite polarity. Since the timing detection circuit 231 detects a timing when the slope is 0, it is considered that, for example, even if the oscillation waveform of the primary-side voltage V1 varies, it is possible to detect a timing very close to a timing when the oscillation waveform has a peak having the opposite polarity, as a timing to switch the ON/OFF states of the individual switches S.

By such a component (method), the timing detection circuit 231 detects a timing corresponding to an opposite-polarity peak of the oscillation waveform of the primary-side voltage V1, as a timing to switch the ON/OFF states of the individual switches S. Also, if detecting a timing to switch the ON/OFF states of the individual switches S, the timing detection circuit 231 notifies it.

When receiving a notification that a timing to switch the ON/OFF states of the individual switches S has been detected, from the timing detection circuit 231 (for example, in the case where the timing detection circuit 231 is configured with an integrator circuit, when the value of integral of the voltage value of the primary-side voltage V1), the switching-timing controller 23 outputs the control signals C for switching the ON/OFF states of the individual switches S, to the corresponding switches S included in the switch section 11, respectively. The control signals C which the switching-timing controller 23 outputs to the individual switches S are identical to those which the switching-timing controller 13 included in the pulse signal output circuit 10 outputs. In this way, in the primary-side circuit of the pulse signal output circuit 20, at a timing detected based on the voltage value of the primary-side voltage V1 acquired and monitored, the ON/OFF states of the individual switches S included in the switch section 11 is switched, whereby the direction of application of the primary-side current i1, which is the current supplied from the DC power supply PS connected to the switch section 11, to the primary coil of the pulse transformer 14 is switched (reversed). Timings when the switching-timing controller 23 switches the ON/OFF states of the individual switches S included in the switch section 11 will be described later.

Also, the secondary-side circuit of the pulse signal output circuit 20 is composed of the secondary coil of the pulse transformer 14, the rectifying section 15, the secondary-side capacitor 16, the secondary-side resistor 17, and the FET 18. The configuration of the secondary-side circuit of the pulse signal output circuit 20 is the same as the configuration of the secondary-side circuit of the pulse signal output circuit 10. Therefore, a detailed description of the configuration and operation of the secondary-side circuit of the pulse signal output circuit 20 will not be made.

By this configuration, the pulse signal output circuit 20 detects each timing to switch the direction of application of the primary-side current i1 which is the current supplied from the DC power supply PS connected to the pulse signal output circuit. Also, at each detected timing, similarly to the pulse signal output circuit 10, the pulse signal output circuit 20 switches the direction of application of the primary-side current i1 which is the current supplied from the DC power supply PS, thereby generating the pulse signal, and outputs the generated pulse signal to the receiver RE.

Now, the operation of the pulse signal output circuit 20 will be described. The operation of the whole of the pulse signal output circuit 20 is the same as the operation of the pulse signal output circuit 10. In other words, the operation of the whole of the pulse signal output circuit 20 can be easily supposed by referring to the polarities of the waveforms of the ON/OFF states of the individual switches S, the primary-side voltage V1 (the secondary-side voltage V2), and the secondary-side current i2 in the operation of the whole of the pulse signal output circuit 10 shown in FIG. 2, along the direction in which the primary-side current i1 is applied in the primary-side circuit of the pulse signal output circuit 20. Therefore, a detailed description of the operation of the whole of the pulse signal output circuit 20 will not be made, and with a focus on the operations of the switching-timing controller 23 and the timing detection circuit 231 included in the pulse signal output circuit 20, only a timing which the switching-timing controller 23 switches the ON/OFF states of the individual switches S included in the switch section 11 (the timing in one period of the switches) will be described with reference to FIG. 6. In the pulse signal output circuit 20 shown in FIG. 5, the direction which is indicated by each of the primary-side current i1, the secondary-side current i2, and the rectified current i3 is the positive direction, similarly to the direction which is indicated by each of the primary-side current i1, the secondary-side current i2, and the rectified current i3 in the pulse signal output circuit 10 shown in FIG. 1.

Figure 6:
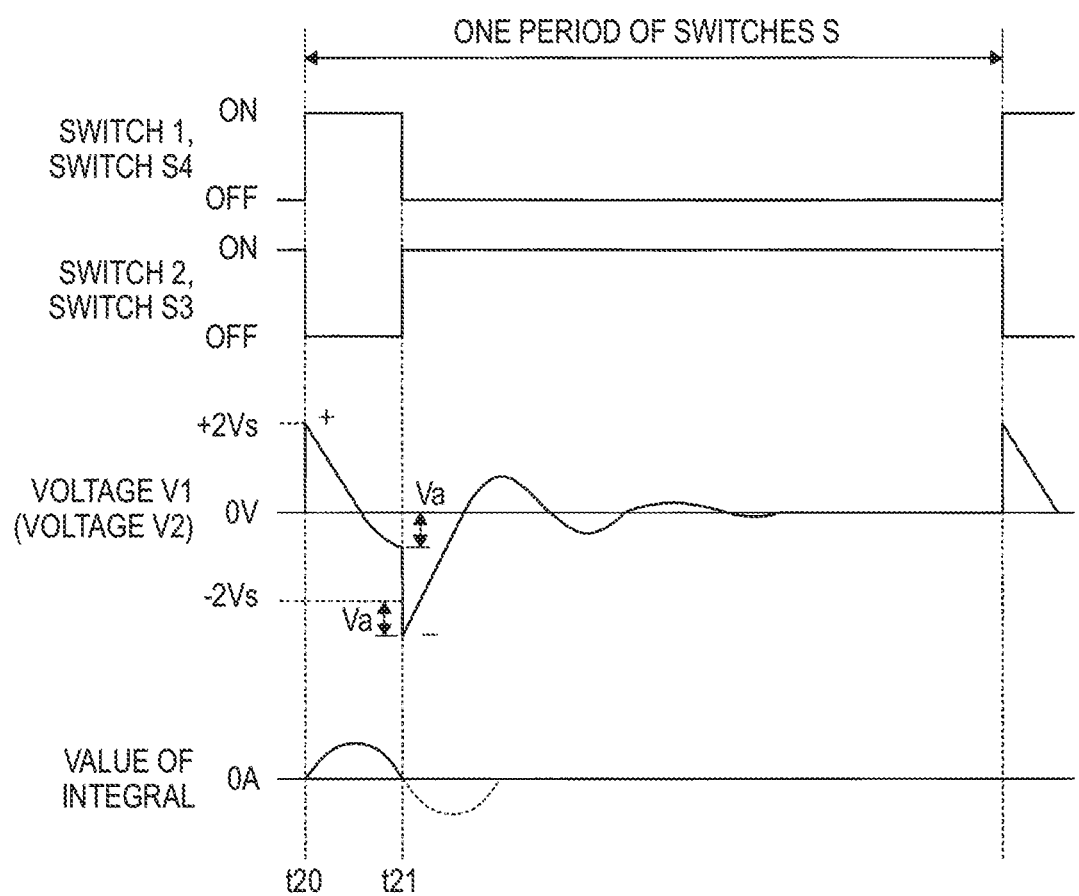
FIG. 6 is a waveform diagram for explaining an example of a timing when switches included in a switch section in the pulse signal output circuit of the second embodiment of the present invention are switched.

FIG. 6 is a waveform diagram for explaining an example of a timing when the switches S included in the switch section 11 are switched in the pulse signal output circuit 20 of the second embodiment of the present invention. The example of a timing when the switches S included in the switch section 11 are switched, shown in FIG. 6, is an example corresponding to one period of the switches S in which the switching-timing controller 23 switches the ON/OFF states of the individual switches S such that the pulse signal output circuit 20 outputs the pulse signal at the low level, in the case where the timing detection circuit 231 of the switching-timing controller 23 is composed of an integrator circuit. In other words, the example of a timing to switch the switches S included in the switch section 11, shown in FIG. 6, is an example of the case where the timing detection circuit 231 included in the switching-timing controller 23 performs the integral of the voltage value of the primary-side voltage V1 acquired, and detects a timing when the value of integral is 0, as a timing to switch the ON/OFF states of the individual switches S. FIG. 6 schematically shows the waveforms (signals) and levels of variations in the ON/OFF states of the individual switches S included in the switch section 11, the primary-side voltage V1 of the primary coil of the pulse transformer 14, and the value of integral of the voltage value of the primary-side voltage V1 which is obtained by the timing detection circuit 231.

Also, similarly in the pulse signal output circuit 10, even in the pulse signal output circuit 20, the secondary-side voltage V2 attributable to the primary-side voltage V1 is induced on the secondary coil of the pulse transformer 14. Therefore, it can be said that the waveform of the primary-side voltage V1 of the primary coil shown in FIG. 6 is the same as the waveform of the secondary-side voltage V2 which is induced on the secondary coil of the pulse transformer 14. Therefore, in the following description, similarly in the description of the example of variations in the primary-side voltage and the secondary-side voltage in the pulse signal output circuit 10, the waveform of the primary-side voltage V1 of the primary coil of the pulse transformer 14 and the waveform of the secondary-side voltage V2 of the secondary coil will be appropriately referred to in place of each other.

At a timing t20, the switching-timing controller 23 switches the switch S and the switch S4 from the OFF state to the ON state by the control signal CP, and switches the switch S2 and the switch S3 from the ON state to the OFF state by the control signal CN. Then, the voltage Vs output from the DC power supply PS is applied to the primary-side circuit of the pulse signal output circuit 20, and the primary-side current i1 flows in the positive direction along the switch S1 included in the switch section 11, the primary coil of the pulse transformer 14 (from the first terminal A1 to the second terminal B1), the primary-side capacitor 12, and the switch S4 included in the switch section 11. Therefore, similarly in the pulse signal output circuit 10, the primary-side voltage V1 having the voltage value of +2Vs is applied to the primary coil of the pulse transformer 14. Even in the pulse signal output circuit 20, similarly in the pulse signal output circuit 10, the waveform of the primary-side voltage V1 oscillates due to the serial resonance circuit composed of the inductance component of the primary coil of the pulse transformer 14 and the primary-side capacitor 12.

At this time, the secondary-side circuit of the pulse signal output circuit 20 also operates similarly to the secondary-side circuit of the pulse signal output circuit 10. In other words, on the secondary coil of the pulse transformer 14, the secondary-side voltage V2 attributable to the primary-side voltage V1 of the primary coil of the pulse transformer 14 is induced. Further, even in the pulse signal output circuit 20, similarly in the pulse signal output circuit 10, the waveform of the secondary-side voltage V2 which is induced on the secondary coil of the pulse transformer 14 oscillates. Furthermore, even in the secondary-side circuit of the pulse signal output circuit 20, similarly in the secondary-side circuit of the pulse signal output circuit 10, when the secondary-side voltage V2 is induced on the secondary coil of the pulse transformer 14, the secondary-side current i2 flows, and the rectifying section 15 performs full-wave rectification on the secondary-side current, and the rectified current i3 flows, whereby the rectified voltage V3 according to the rectified current i3 is applied between the terminals of the secondary-side capacitor 16, between the terminals of the secondary-side resistor 17, and between the gate terminal and source terminal of the FET. Therefore, even in the pulse signal output circuit 20, similarly in the pulse signal output circuit 10, the secondary-side capacitor 16 is charged with the rectified current i3, and the FET 18 is switched on by the rectified voltage V3 applied between the gate terminal and the source terminal, and the pulse signal at the low level is transmitted to the receiver RE.

Thereafter, even in the pulse signal output circuit 20, similarly in the pulse signal output circuit 10, the primary-side voltage V1 drops due to oscillation attributable to series resonance. In this case, the secondary-side circuit of the pulse signal output circuit 20 operates similarly to the secondary-side circuit of the pulse signal output circuit 10. In other words, when the voltage value of the primary-side voltage V1 drops in the primary-side circuit of the pulse signal output circuit 20, in the secondary-side circuit of the pulse signal output circuit 20, when the secondary-side voltage V2 drops below the forward voltage of some diodes D (more specifically, the diode D1 and the diode D4) included in the rectifying section 15, the diodes D are switched off. Then, even in the pulse signal output circuit 20, similarly in the pulse signal output circuit 10, the current value of the rectified current i3 which is obtained by full-wave rectification of the rectifying section 15 becomes 0 A, i.e. the amount of rectified current i3 which is applied between the terminals of the secondary-side capacitor 16 and between the terminals of the secondary-side resistor 17 becomes zero. Therefore, even in the pulse signal output circuit 20, similarly in the pulse signal output circuit 10, the rectified voltage V3 according to the rectified current i3, i.e. the voltage between the gate terminal and source terminal of the FET 18 also stops rising. Even in the pulse signal output circuit 20, similarly in the pulse signal output circuit 10, if the rectified current i3 which is obtained by full-wave rectification of the rectifying section 15 becomes 0 A, the charge stored in the secondary-side capacitor 16 is released by the configuration of the secondary-side capacitor 16 and the secondary-side resistor 17, such that the FET 18 is maintained in the ON state. Therefore, even in the pulse signal output circuit 20, similarly in the pulse signal output circuit 10, the pulse signal to be output is maintained at the low level.

Also, in the pulse signal output circuit 20, at the timing t20, the timing detection circuit 231 included in the pulse signal output circuit 20 starts the integral (summing) of the voltage value of the primary-side voltage V1. Therefore, when the primary-side voltage V1 having the voltage value of +2Vs is input, the value of integral of the voltage value of the primary-side voltage V1 which is obtained by the timing detection circuit 231 increases, and thereafter, as the voltage value of the primary-side voltage V1 drops to the voltage value of −2Vs, the value of integral decreases. If the value of integral of the voltage value of the primary-side voltage V1 becomes 0 at a timing t21, the timing detection circuit 231 notifies that the timing to switch the ON/OFF states of the individual switches S has been detected. Then, the switching-timing controller 23 switches each switch S of the switch S1 and the switch S4 from the ON state to the OFF state by the control signal CP, and switches each switch S of the switch S2 and the switch S3 from the OFF state to the ON state by the control signal CN. As shown in FIG. 6, at the timing t21, the primary-side voltage V1 changes to a negative voltage value lower than the negative voltage value of −2Vs according to the supplied current by a negative voltage value −Va. Therefore, when the switching-timing controller 23 switches the individual switches S, the primary-side voltage V1 changes to a negative voltage value of −(2Vs+Va) lower than the negative voltage value according to the supplied current by the negative voltage value of −Va.

Thereafter, even in the pulse signal output circuit 20, similarly in the pulse signal output circuit 10, the voltage value of the primary-side voltage V1 rises due to oscillation attributable to series resonance. At this time, the secondary-side circuit of the pulse signal output circuit 20 operates similarly to the secondary-side circuit of the pulse signal output circuit 10. In other words, when the voltage value of the primary-side voltage V1 drops in the pulse signal output circuit 20, if the secondary-side voltage V2 drops below the forward voltage of some diodes D (more specifically, the diode D2 or the diode D3) included in the rectifying section 15 in the secondary-side circuit of the pulse signal output circuit 20, the diodes D are switched off. Then, even in the pulse signal output circuit 20, similarly in the pulse signal output circuit 10, the current value of the rectified current i3 which is obtained by full-wave rectification of the rectifying section 15 becomes 0 A, i.e. the amount of rectified current i3 which is applied between the terminals of the secondary-side capacitor 16 and between the terminals of the secondary-side resistor 17 becomes zero, and the rectified voltage V3 according to the rectified current i3 (the voltage between the gate terminal and source terminal of the FET 18) also stops rising. However, even in the pulse signal output circuit 20, similarly in the pulse signal output circuit 10, even if the rectified current i3 which is obtained by full-wave rectification of the rectifying section 15 becomes 0 A, since the charge stored in the secondary-side capacitor 16 is released by the configuration of the secondary-side capacitor 16 and the secondary-side resistor 17, the ON state of the FET 18 is maintained. Therefore, even in the pulse signal output circuit 20, similarly in the pulse signal output circuit 10, the pulse signal to be output is maintained at the low level.

As described above, in the pulse signal output circuit 20, after the switching-timing controller 23 switches the ON/OFF states of the individual switches S at the timing t20, at the timing t21 which the timing detection circuit 231 has detected as a timing to switch the ON/OFF states of the individual switches S, the switching-timing controller switches each of the switches S. Therefore, even in the pulse signal output circuit 20, similarly in the pulse signal output circuit 10, it is possible to change the primary-side voltage V1 to a voltage value having a larger absolute value when the switches S are switched, as compared to the case of switching the switches when the polarity of the primary-side voltage V1 is positive or when the voltage value of the primary-side voltage is 0 V. Therefore, even in the pulse signal output circuit 20, similarly in the pulse signal output circuit 10, the primary-side current i1 which flows in the primary coil of the pulse transformer 14 and the primary-side capacitor 12 is higher, and the secondary-side voltage V2 which is induced on the secondary coil of the pulse transformer 14 also is higher. In other words, even in the pulse signal output circuit 20, similarly in the pulse signal output circuit 10, it is possible to improve the efficiency of transmission of power from the primary coil of the pulse transformer 14 to the secondary coil. Therefore, even in the pulse signal output circuit 20, similarly in the pulse signal output circuit 10, the secondary-side current i2 which flows due to the secondary-side voltage V2 which is induced on the secondary coil of the pulse transformer 14, and the rectified current i3 which is obtained by full-wave rectification of the rectifying section 15 also are higher, and the rectified voltage V3 which is applied between the terminals of the secondary-side capacitor 16, between the terminals of the secondary-side resistor 17, and between the gate terminal and source terminal of the FET, according to the rectified current i3 also is higher. Therefore, even in the pulse signal output circuit 20, similarly in the pulse signal output circuit 10, the secondary-side capacitor 16 is charged with the larger amount of rectified current i3, and it is possible to obtain high drive voltage for the gate terminal of the FET 18.

In FIG. 6, the switching-timing controller 23 applies the primary-side current i1 to the primary-side circuit of the pulse signal output circuit 20 in the order of the positive direction and the negative direction, whereby the pulse signal output circuit 20 outputs the pulse signal at the low level. However, even in the pulse signal output circuit 20, similarly in the pulse signal output circuit 10, even in the case of applying the primary-side current i1 to the primary-side circuit of the pulse signal output circuit 20 in the order of the negative direction and the positive direction, it is possible to output the pulse signal at the low level. The operations of the switching-timing controller 23 and the timing detection circuit 231 in this case can be easily supposed by reversing the polarities of the waveforms of the ON/OFF states of the individual switches S, the primary-side voltage V1 of the primary coil of the pulse transformer 14, and variation in the value of integral of the voltage value of the primary-side voltage V1 which is obtained by the timing detection circuit 231. Therefore, a detailed description of the operation of the pulse signal output circuit 20 in the case of applying the primary-side current i1 to the primary-side circuit of the pulse signal output circuit 20 in the order of the negative direction and the positive direction will not be made.

As described above, in the pulse signal output circuit 20, the voltage value of the primary-side voltage V1 which is applied to the primary coil of the pulse transformer 14 is input to the timing detection circuit 231 included in the second main coil 28, and based on the voltage value of the primary-side voltage V1, the timing detection circuit detects a timing to switch the ON/OFF states of the individual switches S included in the switch section 11. In this configuration, the timing detection circuit 231 detects a timing very close to a timing when the oscillation waveform of the primary-side voltage V1 has a peak having the opposite polarity, regardless of the direction in which the primary-side current i1 is applied for the first time (the order of the directions in which the primary-side current is applied). Further, in the pulse signal output circuit 20, at the timing which the timing detection circuit 231 has detected as a timing to switch the ON/OFF states of the individual switches S, the switching-timing controller 23 switches the ON/OFF states of the individual switches S included in the switch section 11. Therefore, even in the pulse signal output circuit 20, similarly in the pulse signal output circuit 10, regardless of the direction in which the primary-side current i1 is applied for the first time, it is possible to improve the efficiency of transmission of power from the primary coil of the pulse transformer 14 to the secondary coil, and it is possible to obtain high drive voltage for the gate terminal of the FET 18.

Further, in the pulse signal output circuit 20, based on the voltage value of the primary-side voltage V1 which is input and monitored, the timing detection circuit 231 included in the switching-timing controller 23 can more reliably detect the timing when the oscillation waveform of the primary-side voltage V1 has the first peak having the opposite polarity, as a timing to switch the ON/OFF states of the individual switches S. Therefore, in the pulse signal output circuit 20, in addition to the same effects as those of the pulse signal output circuit 10, it is possible to achieve other effects such as an improvement in the resistance to change in the constant of each component of the pulse signal output circuit 20 attributable to a rise in the temperature of the component, and improvement in the resistance to the influence of unevenness in the constants of components.

As described above, according to the embodiments of the present invention, the pulse signal output circuit includes the switching-timing controller. Further, in the embodiments of the present invention, after the oscillation waveform of the voltage of the primary-side circuit changes to the opposite polarity, the switching-timing controller switches the ON/OFF states of the individual switches included in the switch section. Therefore, in the embodiments of the present invention, it is possible to improve the efficiency of transmission of power from the primary coil of the pulse transformer included in the pulse signal output circuit to the secondary coil, and it is possible to obtain high drive voltage for the gate terminal of the FET, provided on the secondary-side circuit and configured to be switched on and off according to the voltage which is applied to the gate terminal, thereby generating the pulse signal and outputting it.

Also, in the embodiments of the present invention, at a timing when the oscillation waveform of the voltage of the primary-side circuit has a peak having the opposite polarity, the switching-timing controller switches the ON/OFF states of the individual switches included in the switch section. Therefore, in the embodiments of the present invention, when the ON/OFF states of the individual switches are switched, it is possible to change the voltage of the primary-side circuit to a voltage value having an absolute value larger than that of the voltage value according to the supplied current by the absolute value of the peak having the opposite polarity. Therefore, in the embodiments of the present invention, it is possible to improve the efficiency of transmission of power from the primary coil of the pulse transformer included in the pulse signal output circuit to the secondary coil, and it is possible to obtain high drive voltage for the gate terminal of the FET configured to generate the pulse signal and output it.

However, the basic configuration of a pulse signal output circuit to which the configurations of the embodiments of the present invention can be applied, i.e. the configuration other than the switching-timing controller is not limited to the configurations described in the embodiments of the present invention. In other words, the basic configuration of a pulse signal output circuit which can be configured to include a switching-timing controller for switching the ON/OFF states of individual switches after the oscillation waveform of voltage which is applied to the primary coil of a pulse transformer is changes to the opposite polarity may be different from the configurations shown in the embodiments of the present invention.

First Modification

Figure 7:
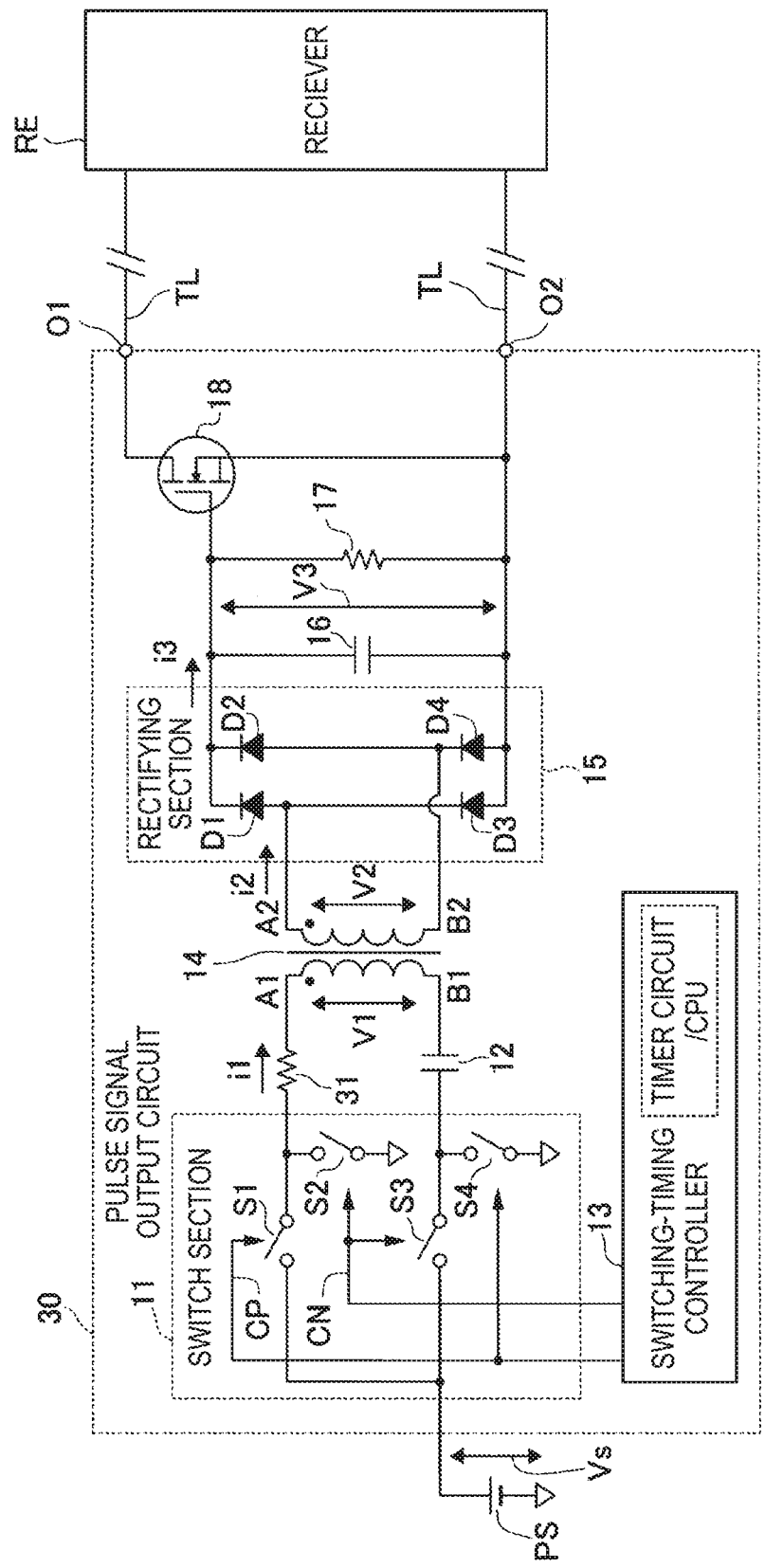
FIG. 7 is a configuration diagram illustrating the configuration of a pulse signal output circuit according to a first modification of the present invention.

Now, pulse signal output circuits having other configurations including switching-timing controllers will be described. FIG. 7 is a configuration diagram illustrating the configuration of a pulse signal output circuit according to a first modification of the present invention. A pulse signal output circuit 30 includes a switch section 11, a primary-side resistor 31, a primary-side capacitor 12, a switching-timing controller 13, a pulse transformer 14, a rectifying section 15, a secondary-side capacitor 16, a secondary-side resistor 17, and an FET 18. FIG. 7 also shows a DC power supply PS and a receiver RE which are connected to the pulse signal output circuit 30. In the pulse signal output circuit 30 shown in FIG. 7, the direction which is indicated by each of the primary-side current i1, the secondary-side current i2, and the rectified current i3 is the positive direction, similarly to the direction which is indicated by each of the primary-side current i1, the secondary-side current i2, and the rectified current i3 in the pulse signal output circuit 10 shown in FIG. 1.

The pulse signal output circuit 30 has the same configuration as the configuration of the pulse signal output circuit 10 of the first embodiment shown in FIG. 1, except that it further includes the primary-side resistor 31. The other components of the pulse signal output circuit 30 are identical to the components of the pulse signal output circuit 10 of the first embodiment shown in FIG. 1. Therefore, in the following description, of the components of the pulse signal output circuit 30, the components identical to the components of the pulse signal output circuit 10 of the first embodiment will be denoted by the same reference symbols, and a detailed description of those components will not be made.

Similarly to the pulse signal output circuit 10 and the pulse signal output circuit 20, the pulse signal output circuit 30 also switches the direction of application of the primary-side current i1 supplied from the DC power supply PS connected to the pulse signal output circuit, by the switch section 11, thereby generating a pulse signal, and outputs the generated pulse signal to the receiver RE. Similarly to the pulse signal output circuit 10 and the pulse signal output circuit 20, the pulse signal output circuit 30 also can be used in, for example, a field device.

The primary-side circuit of the pulse signal output circuit 30 is configured by adding the primary-side resistor 31 between the switch section 11 and the primary coil of the pulse transformer 14 to the primary-side circuit of the pulse signal output circuit 10. More specifically, in the primary-side circuit of the pulse signal output circuit 30, a first terminal of the primary-side resistor 31 is connected to the first output terminal of the switch section 11, and a second terminal of the primary-side resistor 31 is connected to the first terminal A1 of the primary coil of the pulse transformer 14. However, the primary-side resistor 31 is not limited to the configuration composed of one resistor, and may be configured with a plurality of resistors. Also, in the primary-side circuit of the pulse signal output circuit 30, the primary-side resistor 31 can be placed at any position on the channel for applying the primary-side current i1 from the switch section 11 to the pulse transformer 14. The other connections in the primary-side circuit of the pulse signal output circuit 30, i.e. the other connections of the components constituting the primary-side circuit of the pulse signal output circuit 30 are the same as the connections of the components of the primary-side circuit of the pulse signal output circuit 10.

In the pulse signal output circuit 30, due to the primary-side resistor 31, it is possible to suppress oscillation of the primary-side voltage V1 and the primary-side current i1 applied to the primary coil of the pulse transformer 14, attributable to series resonance of the primary coil of the pulse transformer 14 and the primary-side capacitor 12, as compared to the pulse signal output circuit 10 and the pulse signal output circuit 20. In other words, in the pulse signal output circuit 30, it is possible to quickly damp the oscillation of the primary-side voltage V1 and the primary-side current i1 by the primary-side resistor 31. More specifically, in the pulse signal output circuit 10 and the pulse signal output circuit 20, the degree of damping of oscillation of the primary-side voltage V1 is determined according to the resistance value of each of the switches S, included in the switch section 11, in the ON state. In the pulse signal output circuit 30, according to the resistance value of each of the switches S in the ON state and the resistance value of the primary-side resistor 31, the degree of damping of oscillation of the primary-side voltage V1 is determined. Therefore, in the pulse signal output circuit 30, in the case where it is desired to quickly damp oscillation of the primary-side voltage V1 in order to reduce extra current consumption of the primary-side circuit, it is possible to easily and quickly damp oscillation of the primary-side voltage V1 by determining the resistance value of the primary-side resistor 31.

Further, even in the pulse signal output circuit 30, similarly in the pulse signal output circuit 10, the switching-timing controller 13 switches the ON/OFF states of the individual switches included in the switch section 11 after the oscillation waveform of the primary-side voltage V1 changes to the opposite polarity. Therefore, even in the pulse signal output circuit 30, similarly in the pulse signal output circuit 10, when the primary-side voltage has an opposite-polarity voltage value having an absolute value Va, the ON/OFF states of the individual switches S are switched. Therefore, when the ON/OFF states of the individual switches S are switched, the primary-side voltage changes to a voltage value having an absolute value larger than that of the voltage value according to the supplied current by Va. However, even in the pulse signal output circuit 30, similarly in the pulse signal output circuit 10, even after switching of the ON/OFF states of the individual switches S, the primary-side voltage V1 oscillates due to series resonance of the primary coil of the pulse transformer 14 and the primary-side capacitor 12 (see the waveform of the primary-side voltage V1 (the secondary-side voltage V2) in the pulse signal output circuit 10 shown in FIG. 3 or FIG. 4). The primary-side resistor 31 of the pulse signal output circuit 30 helps to more quickly converge oscillation of the primary-side voltage V1, particularly, after the switching-timing controller 13 switches the ON/OFF states of the individual switches S, thereby reducing extra current consumption of the primary-side circuit.

Meanwhile, the configuration of the secondary-side circuit of the pulse signal output circuit 30 is the same as the configuration of the secondary-side circuit of the pulse signal output circuit 10. Therefore, a detailed description of the configuration and operation of the secondary-side circuit of the pulse signal output circuit 30 will not be made. Also, the operation of the whole of the pulse signal output circuit 30, and timings when the switching-timing controller 13 switches the ON/OFF states of the individual switches S are the same as those of the pulse signal output circuit 10, except that the oscillation waveform of the primary-side voltage V1 is quickly converged. Therefore, a detailed description of the operation of the whole of the pulse signal output circuit 30, and timings when the switching-timing controller 13 switches the ON/OFF states of the individual switches S will not be made.

As described above, even in the pulse signal output circuit 30, similarly in the pulse signal output circuit 10, when the oscillation waveform of the primary-side voltage V1 has the opposite polarity, the switching-timing controller 13 switches the ON/OFF states of the individual switches S included in the switch section 11. Therefore, even in the pulse signal output circuit 30, it is possible to obtain the same effects as those of the pulse signal output circuit 10. In other words, even in the pulse signal output circuit 30, similarly in the pulse signal output circuit 10, it is possible to improve the efficiency of transmission of power from the primary coil of the pulse transformer 14 to the secondary coil, and it is possible to obtain high drive voltage for the gate terminal of the FET 18. Further, in the pulse signal output circuit 30, due to the addition of the primary-side resistor 31 to the primary-side circuit, it is possible to quickly converge oscillation of the primary-side voltage V1 and the primary-side current i1 (particularly, oscillation of the primary-side voltage V1 after the switching-timing controller 13 switches the ON/OFF states of the individual switches S), thereby reducing extra current consumption of the primary-side circuit due to oscillation of the primary-side voltage V1.

Second Modification

Figure 8:
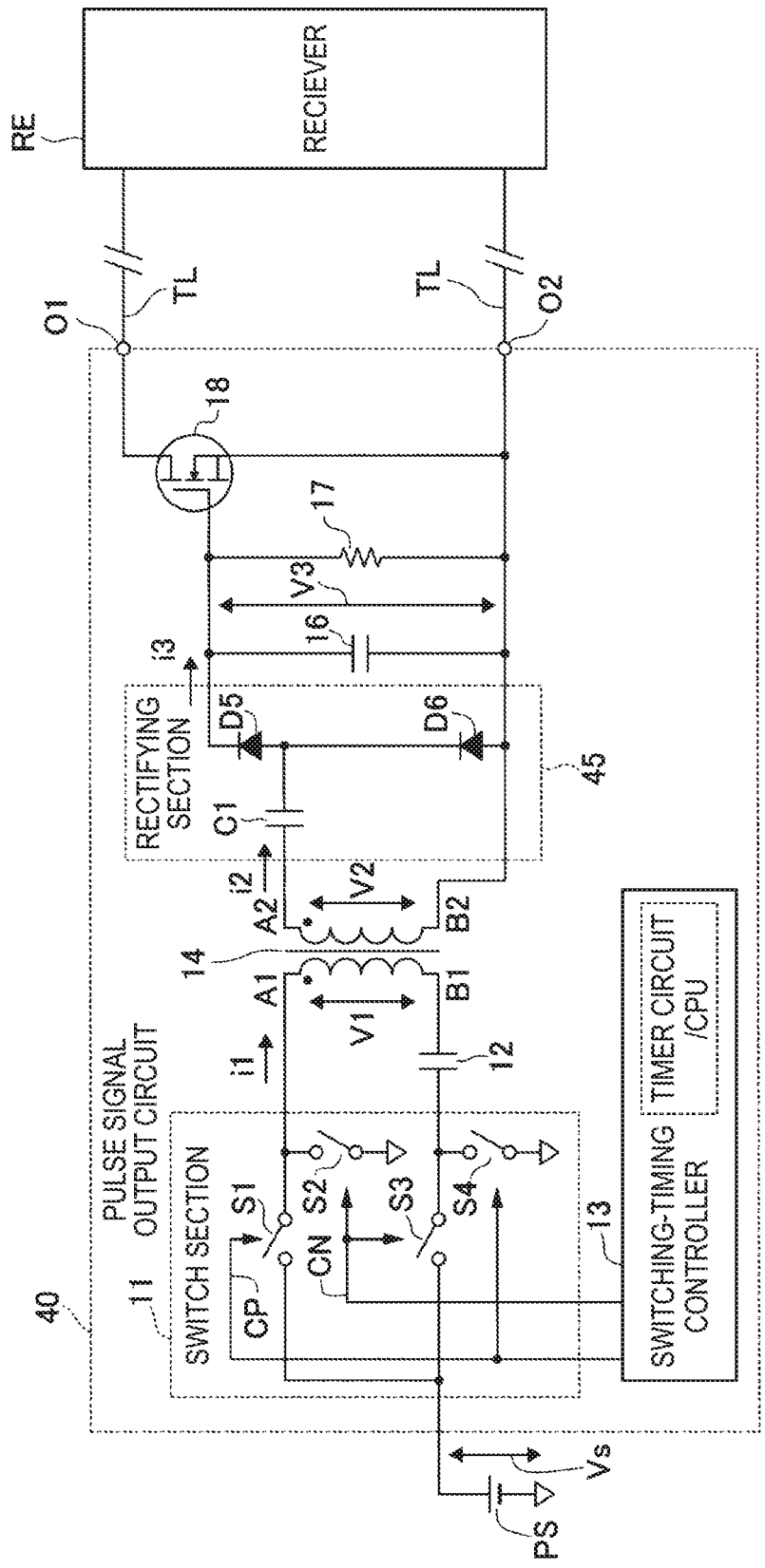
FIG. 8 is a configuration diagram illustrating the configuration of a pulse signal output circuit according to a second modification of the present invention.

Now, a pulse signal output circuit having another configuration including a switching-timing controller will be described. FIG. 8 is a configuration diagram illustrating the configuration of a pulse signal output circuit according to a second modification of the present invention. A pulse signal output circuit 40 includes a switch section 11, a primary-side capacitor 12, a switching-timing controller 13, a pulse transformer 14, a rectifying section 45, a secondary-side capacitor 16, a secondary-side resistor 17, and an FET 18. FIG. 8 also shows a DC power supply PS and a receiver RE which are connected to the pulse signal output circuit 40. In the pulse signal output circuit 40 shown in FIG. 8, the direction which is indicated by each of the primary-side current i1, the secondary-side current i2, and the rectified current i3 is the positive direction, similarly to the direction which is indicated by each of the primary-side current i1, the secondary-side current i2, and the rectified current i3 in the pulse signal output circuit 10 shown in FIG. 1.

The pulse signal output circuit 40 has the same configuration as the configuration of the pulse signal output circuit 10 of the first embodiment shown in FIG. 1, except that it has the rectifying section 45 in place of the rectifying section 15. The other components of the pulse signal output circuit 40 are identical to the components of the pulse signal output circuit 10 of the first embodiment shown in FIG. 1. Therefore, in the following description, of the components of the pulse signal output circuit 40, the components identical to the components of the pulse signal output circuit 10 of the first embodiment will be denoted by the same reference symbols, and a detailed description of those components will not be made.

Similarly to the pulse signal output circuit 10 to the pulse signal output circuit 30, the pulse signal output circuit 40 also switches the direction of application of the primary-side current i1 supplied from the DC power supply PS connected to the pulse signal output circuit, by the switch section 11, thereby generating a pulse signal, and outputs the generated pulse signal to the receiver RE. Similarly to the pulse signal output circuit 10 to the pulse signal output circuit 30, the pulse signal output circuit 40 also can be used in, for example, a field device.

Also, the configuration of the primary-side circuit of the pulse signal output circuit 40 is the same as the configuration of the primary-side circuit of the pulse signal output circuit 10. Therefore, a detailed description of the configuration and operation of the primary-side circuit of the pulse signal output circuit 40 will not be made.

The secondary-side circuit of the pulse signal output circuit 40 has the same configuration as the configuration of the secondary-side circuit of the pulse signal output circuit 10 except that it has the rectifying section 45 in place of the recycle bin icon 134. More specifically, in the secondary-side circuit of the pulse signal output circuit 40, the first terminal A2 of the secondary coil of the pulse transformer 14 is connected to a first input terminal of the rectifying section 45, and the second terminal B2 of the secondary coil of the pulse transformer 14 is connected to a second input terminal of the rectifying section 45. Further, in the secondary-side circuit of the pulse signal output circuit 40, a first output terminal of the rectifying section 45 is connected to the first terminal of the secondary-side capacitor 16, the first terminal of the secondary-side resistor 17, and the gate terminal of the FET 18. Furthermore, in the secondary-side circuit of the pulse signal output circuit 40, a second output terminal of the rectifying section 45 is connected to the second terminal of the secondary-side capacitor 16, the second terminal of the secondary-side resistor 17, and the source terminal (and back gate terminal) of the FET 18, and this connection point serves as the second output terminal O2 of the pulse signal output circuit 40. The other connections in the secondary-side circuit of the pulse signal output circuit 40, i.e. the other connections of the components constituting the secondary-side circuit of the pulse signal output circuit 40 are the same as the connections of the components of the secondary-side circuit of the pulse signal output circuit 10.

The rectifying section 45 rectifies the voltage supplied between the first input terminal and the second input terminal, and supplies the rectified voltage between the first output terminal and the second output terminal. In other words, similarly to the rectifying section 15, the rectifying section 45 also supplies the rectified voltage between the gate terminal and source terminal of the FET 18 and between the terminals of each of the secondary-side capacitor 16 and the secondary-side resistor 17. The rectifying section 45 has a capacitor C1, a diode D5, and a diode D6. The rectifying section 15 is a voltage doubler rectifier circuit composed of the capacitor C1, the diode D5, and the diode D6, and rectifies the voltage supplied between the first input terminal and the second input terminal, and doubles the rectified voltage, and supplies twice the rectified voltage between the first output terminal and the second output terminal. In the following description, in the case where the diode D5 and the diode D6 included in the rectifying section 45 do not need to be distinguished, they will be referred to as the diodes D.

In the rectifying section 45, a first terminal of the capacitor C1 serves as the first input terminal of the rectifying section 45, and is connected to the first terminal A2 of the secondary coil of the pulse transformer 14. Further, in the rectifying section 45, a second terminal of the capacitor C1 is connected to the anode terminal of the diode D5 and the cathode terminal of the diode D6. Furthermore, in the rectifying section 45, the cathode terminal of the diode D5 serves as the first output terminal of the rectifying section 45, and is connected to the first terminal of the secondary-side capacitor 16, the first terminal of the secondary-side resistor 17, and the gate terminal of the FET 18. Moreover, in the rectifying section 45, the anode terminal of the diode D6 serves as the second input terminal of the rectifying section 45, and is connected to the second terminal B2 of the secondary coil of the pulse transformer 14, and serves as the second output terminal of the rectifying section 45, and is connected to the second terminal of the secondary-side capacitor 16, the second terminal of the secondary-side resistor 17, and the source terminal of the FET 18, and serves as the second output terminal O2 of the pulse signal output circuit 40.

When negative voltage is supplied between the first output terminal and second output terminal of the rectifying section 45, the capacitor C1 is charged with the supplied voltage; whereas when positive voltage is supplied, the charge stored in the capacitor C1 is released, so the rectifying section outputs the supplied positive voltage and the voltage of the charged capacitor C1 together, i.e. twice the supplied voltage in the positive direction. In the secondary-side circuit of the pulse signal output circuit 40, when negative voltage is induced as the secondary-side voltage V2 on the secondary coil of the pulse transformer 14, the capacitor C1 included in the rectifying section 45 is charged with the secondary-side voltage V2. Also, in the secondary-side circuit of the pulse signal output circuit 40, when positive voltage is induced as the secondary-side voltage V2 on the secondary coil of the pulse transformer 14, the positive secondary-side voltage V2 and the secondary-side voltage V2 of the charged capacitor C1, i.e. twice the secondary-side voltage V2 is applied between the gate terminal and source terminal of the FET 18 and between the terminals of each of the secondary-side capacitor 16 and the secondary-side resistor 17. In this way, in the primary-side circuit of the pulse signal output circuit 40, the rectified voltage V3 which is twice the rectified voltage of the pulse signal output circuit 10 is applied between the gate terminal and source terminal of the FET 18.

In the pulse signal output circuit 40, since the rectifying section 45 replaces the rectifying section 15 included in the pulse signal output circuit 10, although the capacitor C1 is added, and the number of diodes D decreases to two. In other words, in the pulse signal output circuit 40, the number of components which constitute the secondary-side circuit decreases by one due to the decrease in the number of diodes D. Further, in general, a mounting area for a capacitor is smaller than a mounting area for a diode. Therefore, in the pulse signal output circuit 40, the rectifying section 45 replacing the rectifying section 15 included in the pulse signal output circuit 10 helps to implement the pulse signal output circuit 40 in a smaller size at lower cost.

By the way, the operation of the whole of the pulse signal output circuit 40, and timings when the switching-timing controller 13 switches the ON/OFF states of the individual switches S are the same as those of the pulse signal output circuit 10, except that the rectifying section 45 outputs the rectified voltage V3. Therefore, a detailed description of the operation of the whole of the pulse signal output circuit 30, and timings when the switching-timing controller 13 switches the ON/OFF states of the individual switches S will not be made.

As described above, even in the pulse signal output circuit 40, similarly in the pulse signal output circuit 10, when the oscillation waveform of the primary-side voltage V1 has the opposite polarity, the switching-timing controller 13 switches the ON/OFF states of the individual switches S included in the switch section 11. Therefore, even in the pulse signal output circuit 40, it is possible to obtain the same effects as those of the pulse signal output circuit 10. In other words, even in the pulse signal output circuit 40, similarly in the pulse signal output circuit 10, it is possible to improve the efficiency of transmission of power from the primary coil of the pulse transformer 14 to the secondary coil, and it is possible to obtain high drive voltage for the gate terminal of the FET 18. Further, in the pulse signal output circuit 40, the rectifying section 45 replaces the rectifying section 15 included in the secondary-side circuit of the pulse signal output circuit 10. Therefore, it is possible to reduce the number and mounting area of components which constitute the secondary-side circuit, and it is possible to implement the pulse signal output circuit 40 in a smaller size at lower cost.

Third Modification

Figure 9:
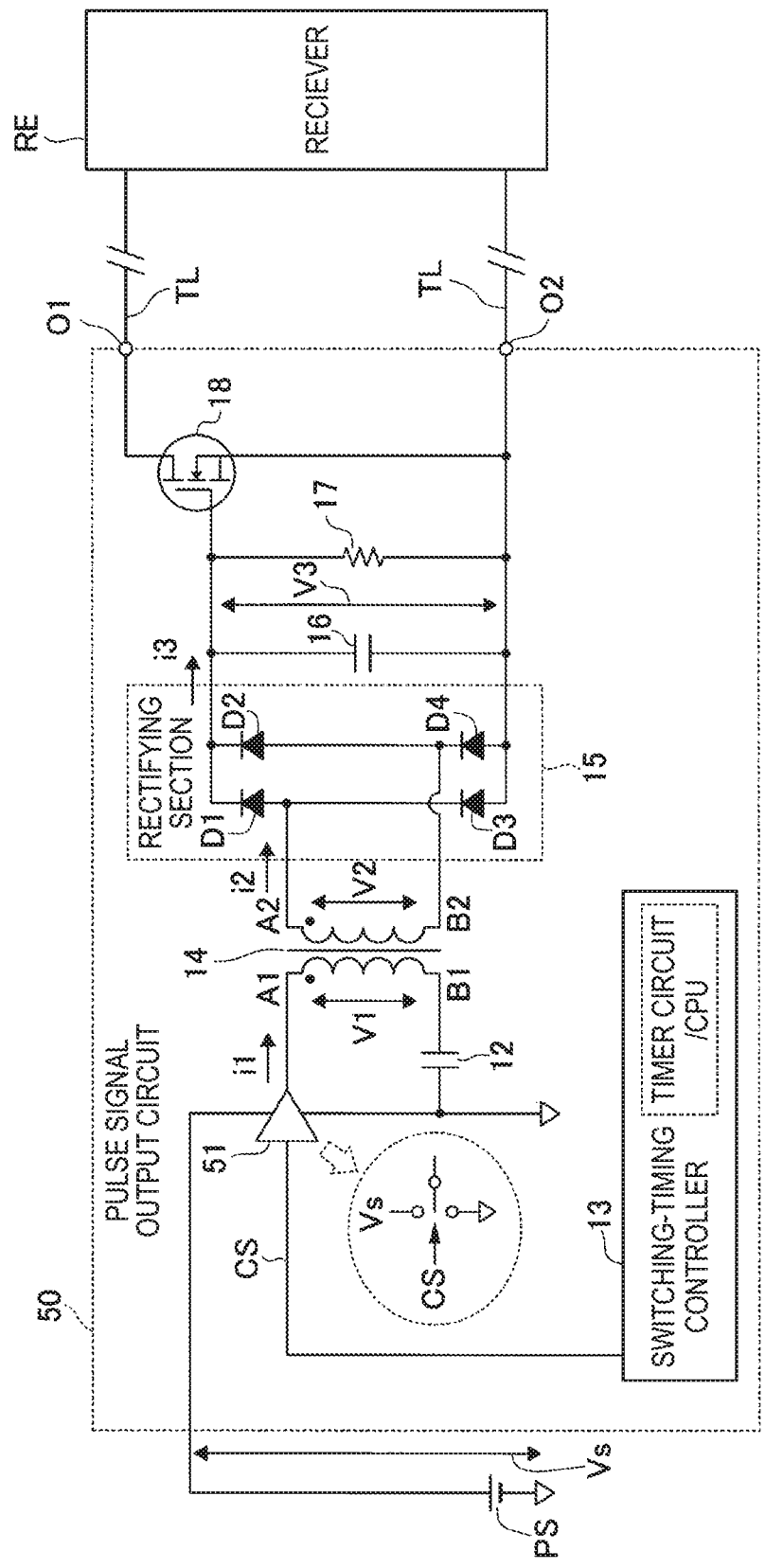
FIG. 9 is a configuration diagram illustrating the configuration of a pulse signal output circuit according to a third modification of the present invention.

Now, a pulse signal output circuit having a further configuration including a switching-timing controller will be described. FIG. 9 is a configuration diagram illustrating the configuration of a pulse signal output circuit according to a third modification of the present invention. A pulse signal output circuit 50 includes a buffer (an output voltage selection circuit) 51, a primary-side capacitor 12, a switching-timing controller 13, a pulse transformer 14, a rectifying section 15, a secondary-side capacitor 16, a secondary-side resistor 17, and an FET 18. FIG. 9 also shows a DC power supply PS and a receiver RE which are connected to the pulse signal output circuit 50. In the pulse signal output circuit 50 shown in FIG. 9, the direction which is indicated by each of the primary-side current i1, the secondary-side current i2, and the rectified current i3 is the positive direction, similarly to the direction which is indicated by each of the primary-side current i1, the secondary-side current i2, and the rectified current i3 in the pulse signal output circuit 10 shown in FIG. 1.

The pulse signal output circuit 50 has the same configuration as the configuration of the pulse signal output circuit 10 of the first embodiment shown in FIG. 1, except that it has the buffer 51 in place of the switch section 11. The other components of the pulse signal output circuit 50 are identical to the components of the pulse signal output circuit 10 of the first embodiment shown in FIG. 1. Therefore, in the following description, of the components of the pulse signal output circuit 50, the components identical to the components of the pulse signal output circuit 10 of the first embodiment will be denoted by the same reference symbols, and a detailed description of those components will not be made.

Similarly to the pulse signal output circuit 10 to the pulse signal output circuit 40, the pulse signal output circuit 50 also switches the direction of application of the primary-side current i1 to the primary coil of the pulse transformer 14, thereby generating a pulse signal, and outputs the generated pulse signal to the receiver RE. In the pulse signal output circuit 10, the switch section 11 switches the direction of application of the primary-side current i1 to the primary coil of the pulse transformer 14; however, in the pulse signal output circuit 50, the buffer 51 switches the direction of application of the primary-side current. Similarly to the pulse signal output circuit 10 to the pulse signal output circuit 40, the pulse signal output circuit 50 also can be used in, for example, a field device.

The primary-side circuit of the pulse signal output circuit 50 has the same configuration as the configuration of the primary-side circuit of the pulse signal output circuit 10 except that it has the buffer 51 in place of the switch section 11. More specifically, in the primary-side circuit of the pulse signal output circuit 50, the power supply terminal of the buffer 51 is connected to the positive terminal of the DC power supply PS. Further, in the primary-side circuit of the pulse signal output circuit 50, the buffer 51 has an input terminal to which a control signal CS is applied from the switch section 11. Furthermore, in the primary-side circuit of the pulse signal output circuit 50, the buffer 51 has an output terminal which is connected to the first terminal A1 of the primary coil of the pulse transformer 14. Moreover, in the primary-side circuit of the pulse signal output circuit 50, the buffer 51 has a reference terminal to which reference voltage is applied and which is connected to the second terminal of the primary-side capacitor 12. The other connections in the primary-side circuit of the pulse signal output circuit 50, i.e. the other connections of the components constituting the primary-side circuit of the pulse signal output circuit 50 are the same as the connections of the components of the primary-side circuit of the pulse signal output circuit 10.

The buffer 51 selects one of the voltage Vs supplied from the DC power supply PS connected to the power supply terminal and the reference voltage, as the output voltage, according to the control signal CS input from the switching-timing controller 13, and outputs the selected voltage to the output terminal. A circuit equivalent to the buffer 51 is a switch for switching the connection of the output terminal between the power supply terminal and the reference terminal according to the control signal CS input from the switching-timing controller 13 as shown in an area of FIG. 9 surrounded by a broken line. Therefore, it can be said that the buffer 51 is a switch section.

In the primary-side circuit of the pulse signal output circuit 50, the connection of the output terminal of the buffer 51 is switched between the power supply terminal and the reference terminal, whereby the direction of application of the primary-side current i1 to the primary coil of the pulse transformer 14 is switched, similarly in the switch section 11 included in the pulse signal output circuit 10. Therefore, in the primary-side circuit of the pulse signal output circuit 50, the primary-side capacitor 12 serves a component for storing charge according to the voltage Vs output from the buffer 51. In other words, the primary-side capacitor 12 is charged with the voltage Vs. The operation of switching the direction of application of the primary-side current i1 to the primary coil of the pulse transformer 14 in the primary-side circuit of the pulse signal output circuit 50 will be described later.

The switching-timing controller 13 controls switching of the connection of the output terminal of the buffer 51. As shown in FIG. 9, in the pulse signal output circuit 50, one control signal CS output from the switching-timing controller 13 is input to the input terminal of the buffer 51. This control signal CS is a control signal corresponding to the control signal CP which is output from the switching-timing controller 13 included in the pulse signal output circuit 10.

Meanwhile, the configuration of the secondary-side circuit of the pulse signal output circuit 50 is the same as the configuration of the secondary-side circuit of the pulse signal output circuit 10. Therefore, a detailed description of the configuration and operation of the secondary-side circuit of the pulse signal output circuit 50 will not be made.

Now, the operation of the pulse signal output circuit 50 will be described. By the way, the operation of the whole of the pulse signal output circuit 50, and timings when the switching-timing controller 13 switches the ON/OFF states of the individual switches S are the same as those of the pulse signal output circuit 10. Therefore, a detailed description of the operation of the whole of the pulse signal output circuit 50, and timings when the switching-timing controller 13 switches the ON/OFF states of the individual switches S will not be made. However, in the pulse signal output circuit 50, the connection of the output terminal of the buffer 51 between the power supply terminal and the reference terminal is switched according to the control signal CS which is output from the switching-timing controller 13, whereby the direction of application of the primary-side current i1 to the primary coil of the pulse transformer 14 is switched. Therefore, hereinafter, with a focus on the operation of switching the direction of application of the primary-side current i1 to the primary coil of the pulse transformer 14 in the pulse signal output circuit 50, the operation of the primary-side circuit of the pulse signal output circuit 50 will be described.

Figure 10:
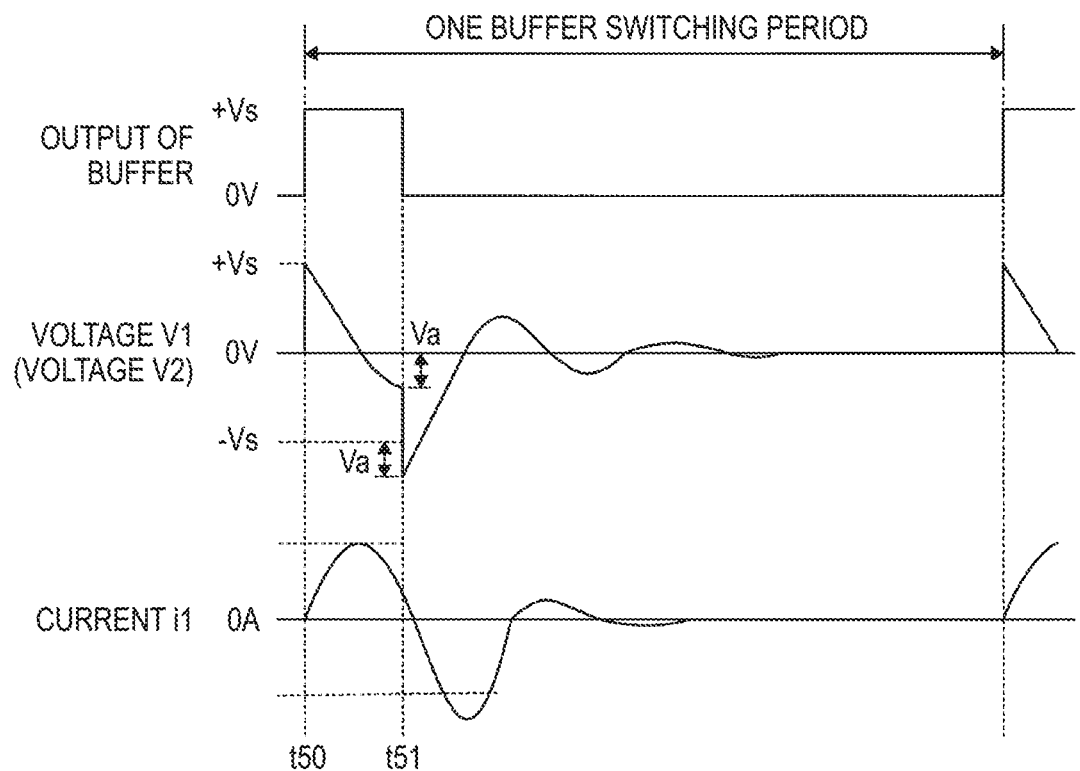
FIG. 10 is a waveform diagram for explaining an example of a timing when switches included in a switch section in the pulse signal output circuit of the third modification embodiment of the present invention are switched.

FIG. 10 is a waveform diagram for explaining an example of a timing when the direction of application of the primary-side current i1 to the primary-side circuit is switched in the pulse signal output circuit 50 of the third modification of the present invention. The example of a timing when the direction of application of the primary-side current i1 to the primary-side circuit is switched, shown in FIG. 10, is an example corresponding to one period in which the switching-timing controller 13 switches the connection of the output terminal of the buffer 51 such that the pulse signal output circuit 50 outputs the pulse signal at the low level. In other words, the example of a timing when the direction of application of the primary-side current i1 to the primary-side circuit is switched, shown in FIG. 10, is an example corresponding to one period in which the switching-timing controller 13 alternately switches the control signal CS in the operation of the pulse signal output circuit 50 similar to the example of the operation of the whole of the pulse signal output circuit 10 shown in FIG. 2. FIG. 10 schematically shows the waveforms (signals) and levels of the output of the buffer 51 (the buffer output), the primary-side voltage V1 of the primary coil of the pulse transformer 14, and the primary-side current i1 which is applied to the primary coil of the pulse transformer 14.

Even in the pulse signal output circuit 50, similarly in the pulse signal output circuit 10, the secondary-side voltage V2 attributable to the primary-side voltage V1 is induced on the secondary coil of the pulse transformer 14. Therefore, it can be said that the waveform of the primary-side voltage V1 of the primary coil shown in FIG. 10 is the same as the waveform of the secondary-side voltage V2 which is induced on the secondary coil of the pulse transformer 14, although they are different in voltage value. Therefore, in the following description, the waveform of the primary-side voltage V1 of the primary coil of the pulse transformer 14 and the waveform of the secondary-side voltage V2 of the secondary coil will be appropriately referred to in place of each other.

In order for the pulse signal output circuit 50 to output the pulse signal at the low level, at a timing t50, the switching-timing controller 13 controls the buffer 51 by control signal CS such that the output terminal of the buffer is connected to the power supply terminal. Therefore, the buffer 51 outputs the voltage Vs (i.e. +Vs) output from the DC power supply PS connected to the power supply terminal, to the output terminal. Then, in the primary-side circuit of the pulse signal output circuit 50, the primary-side current i1 flows in the positive direction along the primary coil of the pulse transformer 14 (from the first terminal A1 to the second terminal B1) and the primary-side capacitor 12. Therefore, the primary-side capacitor 12 is charged with the primary-side current i1, i.e. charge according to the voltage Vs output from the buffer 51 is stored. Further, similarly in the pulse signal output circuit 10, the voltage Vs output from the buffer 51, i.e. the primary-side voltage V1 having the voltage value of +Vs also is applied to the primary coil of the pulse transformer 14. Even in the pulse signal output circuit 50, similarly in the pulse signal output circuit 10, the waveform of the primary-side voltage V1 oscillates due to the serial resonance circuit composed of the inductance component of the primary coil of the pulse transformer 14 and the primary-side capacitor 12.

At this time, on the secondary-side circuit of the pulse signal output circuit 50, the secondary-side voltage V2 attributable to the primary-side voltage V1 of the primary coil of the pulse transformer 14 is induced on the secondary coil of the pulse transformer 14. Further, even in the pulse signal output circuit 50, similarly in the pulse signal output circuit 10, the waveform of the secondary-side voltage V2 which is induced on the secondary coil of the pulse transformer 14 oscillates. Therefore, the secondary-side circuit of the pulse signal output circuit 50 also operates similarly to the secondary-side circuit of the pulse signal output circuit 10. Therefore, even in the pulse signal output circuit 50, similarly in the pulse signal output circuit 10, the secondary-side capacitor 16 is charged with the rectified current i3, and the FET 18 is switched on by the rectified voltage V3 applied between the gate terminal and the source terminal, and the pulse signal at the low level is transmitted to the receiver RE.

Thereafter, even in the pulse signal output circuit 50, similarly in the pulse signal output circuit 10, the primary-side voltage V1 drops due to oscillation attributable to series resonance. By the way, even in the pulse signal output circuit 50, similarly in the pulse signal output circuit 10, at the timing t50, the switching-timing controller 13 starts to measure the preset time (the switching time T). Thereafter, at a timing t51 when the measured time reaches the preset time (the switching time T), the switching-timing controller 13 controls the buffer 51 by control signal CS such that the output terminal of the buffer is connected to the reference terminal. In other words, in the pulse signal output circuit 50, at the timing t51 when the time measured by the switching-timing controller 13 reaches the preset time (the switching time T), the DC power supply PS is disconnected from the buffer 51. Then, in the pulse signal output circuit 50, the charge stored in the secondary-side capacitor 16 by the voltage Vs is released. Therefore, the primary-side current i1 flows in the primary coil of the pulse transformer 14 from the second terminal B1 to the first terminal. In other words, the primary-side current i1 flows in the negative direction in the pulse signal output circuit 50. In this way, the primary-side voltage V1 having the voltage value of −Vs is applied to the primary coil of the pulse transformer 14.

In this configuration, as shown in FIG. 10, at the timing t51 when the primary-side voltage V1 has a negative voltage value of −Va, the connection of the output terminal of the buffer is switched. Therefore, in the pulse signal output circuit 50, the charge stored in the primary-side capacitor 12 by the voltage of Vs is released, whereby the negative voltage of −Vs is applied to the primary coil of the pulse transformer 14, in addition to the negative voltage of −Va. In other words, similarly in the pulse signal output circuit 10, the primary-side voltage changes to the negative voltage having the absolute value of Vs+Va larger than the absolute value of the voltage of −Vs by Va. Therefore, the primary-side current i1 which flows in the negative direction in the pulse signal output circuit 50 is higher than the primary-side current i1 which has been in the positive direction in the pulse signal output circuit 50 before switching of the connection of the output terminal of the buffer 51 to the reference terminal by the switching-timing controller 13.

Thereafter, even in the pulse signal output circuit 50, similarly in the pulse signal output circuit 10, the voltage value of the primary-side voltage V1 rises due to oscillation attributable to series resonance. At this time, the secondary-side circuit of the pulse signal output circuit 20 operates similarly to the secondary-side circuit of the pulse signal output circuit 10. Therefore, even in the pulse signal output circuit 50, similarly in the pulse signal output circuit 10, the charge stored in the secondary-side capacitor 16 is released by the configuration of the secondary-side capacitor 16 and the secondary-side resistor 17, whereby the FET 18 is maintained in the ON state, and the pulse signal to be output is maintained at the low level.

As described above, in the pulse signal output circuit 50, according to the control signal CS which is input from the switching-timing controller 13, the buffer 51 outputs either the voltage Vs supplied from the DC power supply PS connected to the input terminal, or the reference voltage, to the output terminal. Therefore, even in the pulse signal output circuit 50, similarly in the pulse signal output circuit 10 having the switch section 11, the direction of application of the primary-side current i1 to the primary coil of the pulse transformer 14 is switched. As described above, when the primary-side voltage V1 has an opposite-polarity voltage value having the absolute value of Va, the connection of the output terminal of the buffer 51 is switched to the reference terminal. Therefore, even in the pulse signal output circuit 50, similarly in the pulse signal output circuit 10, when the connection of the output terminal of the buffer 51 is switched to the reference terminal, the primary-side voltage V1 changes to an opposite-polarity voltage value having an absolute value larger than that of the opposite-polarity voltage value according to the supplied current by Va. Therefore, even in the pulse signal output circuit 50, similarly in the pulse signal output circuit 10, the secondary-side voltage V2 which is induced on the secondary coil of the pulse transformer 14 is higher. Therefore, even in the pulse signal output circuit 50, similarly in the pulse signal output circuit 10, it is possible to improve the efficiency of transmission of power from the primary coil of the pulse transformer 14 to the secondary coil, and it is possible to obtain high drive voltage for the gate terminal of the FET 18. Therefore, even in the pulse signal output circuit 50, it is possible to obtain the same effects as those of the pulse signal output circuit 10.

Moreover, in the pulse signal output circuit 50, at the timing t51 when the time measured by the switching-timing controller 13 reaches the preset time (the switching time T), the connection of the output terminal of the buffer 51 is switched to the reference terminal by the control signal CS, whereby the DC power supply PS is disconnected from the buffer 51. Therefore, in the pulse signal output circuit 50, in the period when the output terminal of the buffer 51 is connected to the reference terminal, the primary-side current i1 flows in the negative direction in the primary-side circuit, independently from the DC power supply PS. Therefore, in the pulse signal output circuit 50, it is possible to reduce the current consumption of the DC power supply PS in the period when the primary-side current i1 flows in the negative direction in the primary-side circuit. In other words, in the pulse signal output circuit 50, it is possible to reduce the load on the DC power supply PS in the period when the primary-side current i1 flows in the negative direction in the primary-side circuit since the output terminal of the buffer 51 is grounded. Therefore, in the pulse signal output circuit 50, even if the DC power supply PS connected to the pulse signal output circuit has a small amount of applicable current, i.e. a small of suppliable power, it is possible to generate the pulse signal and transmit the generated pulse signal to the receiver RE, without causing stop of supply of power from the DC power supply PS (i.e. without causing the power supply to run out or degrade).

Further, in the pulse signal output circuit 50, the buffer 51 replaces the switch section 11 included in the primary-side circuit of the pulse signal output circuit 10. Therefore, it is possible to reduce the number and mounting area of components which constitutes the primary-side circuit, and it is possible to the pulse signal output circuit 50 in a smaller size at lower cost.

In the above-described modifications, examples of applications of addition of the primary-side resistor 31 (the first modification), replacement of the rectifying section 15 by the rectifying section 45 (the second modification), and replacement of the switch section 11 by the buffer 51 (the third modification) to the pulse signal output circuit 10 shown in FIG. 1 have been described, respectively. However, each of the changes to the pulse signal output circuit 10 described in the above-described modifications do not need to be exclusively applied. In other words, two or more of the changes corresponding to the above-described modifications can be applied to the pulse signal output circuit 10 at the same time. In pulse signal output circuits which are configured by applying two or more of the changes corresponding to the above-described modifications to the pulse signal output circuit 10 at the same time, it is possible to obtain the effects of the modifications corresponding to the applied changes, in addition to the effects which are obtained in the pulse signal output circuit 10.

Fourth Modification

Figure 11:
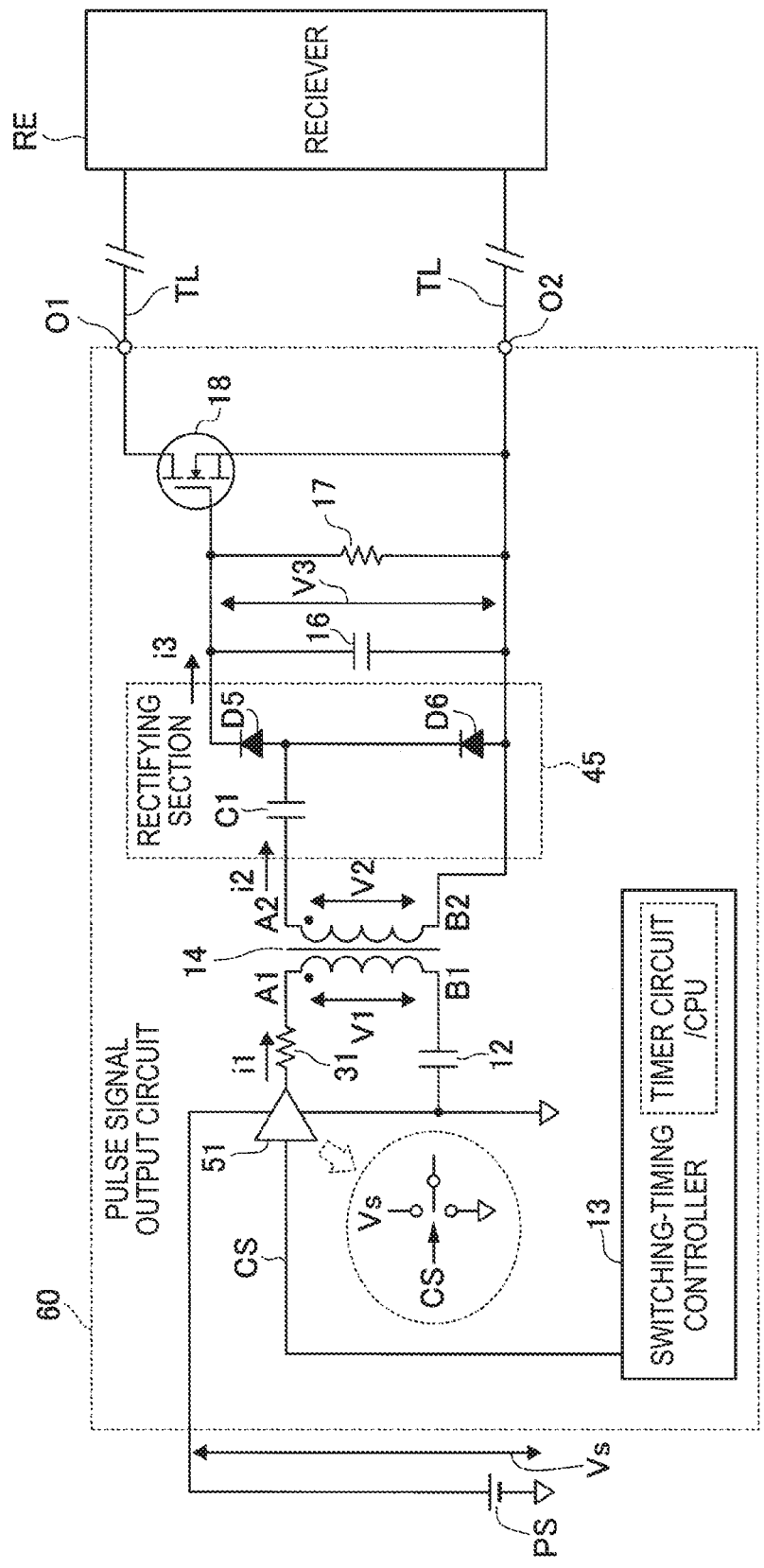
FIG. 11 is a configuration diagram illustrating the configuration of a pulse signal output circuit according to a fourth modification of the present invention.

Now, an example of a pulse signal output circuit which is configured by applying two or more of the changes corresponding to the modifications to the pulse signal output circuit 10 at the same time will be described. FIG. 11 is a configuration diagram illustrating the configuration a pulse signal output circuit according to a fourth modification of the present invention. A pulse signal output circuit 60 includes a buffer 51, a primary-side resistor 31, a primary-side capacitor 12, a switching-timing controller 13, a pulse transformer 14, a rectifying section 45, a secondary-side capacitor 16, a secondary-side resistor 17, and an FET 18. FIG. 11 also shows a DC power supply PS and a receiver RE which are connected to the pulse signal output circuit 60. In the pulse signal output circuit 60 shown in FIG. 11, the direction which is indicated by each of the primary-side current i1, the secondary-side current i2, and the rectified current i3 is the positive direction, similarly to the direction which is indicated by each of the primary-side current i1, the secondary-side current i2, and the rectified current i3 in the pulse signal output circuit 10 shown in FIG. 1.

The pulse signal output circuit 60 has the same configuration as the configuration of the pulse signal output circuit 10 of the first embodiment shown in FIG. 1, except that it has the buffer 51 and the rectifying section 45 in place of the switch section 11 and the rectifying section 15, respectively, and includes the primary-side resistor 31. In other words, the pulse signal output circuit 60 is configured by applying addition of the primary-side resistor 31 described in the first modification, replacement of the rectifying section 15 by the rectifying section 45 described in the second modification, and replacement of the switch section 11 by the buffer 51 described in the third modification, at the same time. The other components of the pulse signal output circuit 60 are identical to the components of the pulse signal output circuit 10 of the first embodiment shown in FIG. 1. Therefore, in the following description, of the components of the pulse signal output circuit 60, the components identical to the components of the pulse signal output circuit 10 of the first embodiment will be denoted by the same reference symbols, and a detailed description of those components will not be made.

Similarly to the pulse signal output circuit 10 to the pulse signal output circuit 50, the pulse signal output circuit 60 also switches the direction of the primary-side current i1 to flow in the primary coil of the pulse transformer 14 when the oscillation waveform of the primary-side voltage V1 has a voltage value having the opposite polarity, thereby generating a pulse signal, and outputs the generated pulse signal to the receiver RE. Similarly to the pulse signal output circuit 10 to the pulse signal output circuit 50, the pulse signal output circuit 60 also can be used in, for example, a field device.

In the pulse signal output circuit 60, in the primary-side circuit, the power supply terminal of the buffer 51 is connected to the positive terminal of the DC power supply PS. Further, in the primary-side circuit of the pulse signal output circuit 60, the buffer 51 has an input terminal to which a control signal CS is input from the switch section 11. Furthermore, in the primary-side circuit of the pulse signal output circuit 60, the output terminal of the buffer 51 is connected to the first terminal of the primary-side resistor 31, and the second terminal of the primary-side resistor 31 is connected to the first terminal A1 of the primary coil of the pulse transformer 14. Moreover, in the primary-side circuit of the pulse signal output circuit 60, the reference voltage is applied to the reference terminal of the buffer 51, which is connected to the second terminal of the primary-side capacitor 12. The other connections in the primary-side circuit of the pulse signal output circuit 60, i.e. the other connections of the components constituting the primary-side circuit of the pulse signal output circuit 60 are the same as the connections of the components of the primary-side circuit of the pulse signal output circuit 10.

Also, in the secondary-side circuit of the pulse signal output circuit 60, the first terminal A2 of the secondary coil of the pulse transformer 14 is connected to the first input terminal of the rectifying section 45, and the second terminal B2 of the secondary coil of the pulse transformer 14 is connected to the second input terminal of the rectifying section 45. Further, in the secondary-side circuit of the pulse signal output circuit 60, the first output terminal of the rectifying section 45 is connected to the first terminal of the secondary-side capacitor 16, the first terminal of the secondary-side resistor 17, and the gate terminal of the FET 18. Furthermore, in the secondary-side circuit of the pulse signal output circuit 60, a second output terminal of the rectifying section 45 is connected to the second terminal of the secondary-side capacitor 16, the second terminal of the secondary-side resistor 17, and the source terminal (and back gate terminal) of the FET 18, and this connection point serves as the second output terminal O2 of the pulse signal output circuit 60. The other connections in the secondary-side circuit of the pulse signal output circuit 60, i.e. the other connections of the components constituting the primary-side circuit of the pulse signal output circuit 60 are the same as the connections of the components of the secondary-side circuit of the pulse signal output circuit 10.

The operation of the whole of the pulse signal output circuit 60, and the operation of switching the direction of application of the primary-side current to the primary coil of the pulse transformer 14 in the primary-side circuit can be easily supposed from the operations of the pulse signal output circuit 10 of the first embodiment and the pulse signal output circuits 30 to 50 of the first to third modifications. Therefore, a detailed description of the operation of the whole of the pulse signal output circuit 60, and the operation of switching the direction of application of the primary-side current to the primary coil of the pulse transformer 14 in the primary-side circuit will not be made.

In the pulse signal output circuit 60, it is possible to obtain the effects of the above-mentioned modifications corresponding to the applied changes, in addition to the effects which are obtained in the pulse signal output circuit 10 of the first embodiment. More specifically, in the pulse signal output circuit 60, due to the addition of the primary-side resistor 31 corresponding to the first modification, it is possible to easily and quickly converge oscillation of the primary-side voltage V1 and the primary-side current i1 applied to the primary coil of the pulse transformer 14, attributable to series resonance of the primary coil of the pulse transformer 14 and the primary-side capacitor 12, thereby capable of reducing extra current consumption of the primary-side circuit. Further, in the pulse signal output circuit 60, due to the replacement of the rectifying section 15 by the rectifying section 45 corresponding to the second modification, it is possible to reduce the number of components which constitute the secondary-side circuit by one due to the decrease in the number of diodes D. Furthermore, in the pulse signal output circuit 60, due to the replacement of the switch section 11 by the buffer 51 corresponding to the third modification, it is possible to reduce the current consumption of the DC power supply PS in the period when the primary-side current i1 flows in the negative direction in the primary-side circuit.

According to this configuration, in the pulse signal output circuit 60, similarly in the pulse signal output circuit 10, when the oscillation waveform of the primary-side voltage V1 has the opposite polarity, the direction of application of the primary-side current to the primary coil of the pulse transformer 14 is switched. Therefore, it is possible to improve the efficiency of transmission of power from the primary coil of the pulse transformer 14 to the secondary coil, and it is possible to obtain high drive voltage for the gate terminal of the FET 18. Further, in the pulse signal output circuit 60, due to the changes corresponding to the pulse signal output circuits 30 to 50 of the first to third modifications, it is possible to implement the pulse signal output circuit 60 in a smaller size at lower cost so as to consume less power.

In the above-mentioned first to fourth modifications, the examples of applications of changes to the components of at least one of the primary-side circuit and secondary-side circuit of the pulse signal output circuit 10 shown in FIG. 1 have been described. However, changes of the components as described in the above-mentioned modifications are not limited to applications to the pulse signal output circuit 10 having the configuration including the switching-timing controller 13. In other words, changes of the components as described in the above-mentioned modifications can also be applied to the pulse signal output circuit 20 having the switching-timing controller 23 in place of the switching-timing controller 13. In pulse signal output circuits which are configured by applying the changes of the components described in the above-mentioned modifications to the pulse signal output circuit 20, it is possible to obtain the effects of the modifications corresponding to the applied changes and described in, in addition to the effects which are obtained in the pulse signal output circuit 20.

As described above, according to the embodiments of the present invention and the modifications of the embodiments, the pulse signal output circuit includes the switching-timing controller. Further, in the embodiments of the present invention and the modifications of the embodiments, when the oscillation waveform of the voltage of the primary-side circuit has the opposite polarity, the switching-timing controller switches the direction of application of the primary-side current to the primary coil of the pulse transformer included in the pulse signal output circuit. Therefore, in the embodiments of the present invention and the modifications of the embodiments, it is possible to improve the efficiency of transmission of power from the primary coil of the pulse transformer included in the primary-side circuit, to the secondary coil, and it is possible to obtain the high drive voltage for the gate terminal of the FET provided in the secondary-side circuit so as to be switched on and off according to the voltage which is applied to the gate terminal, thereby generating the pulse signal and outputting it.

Also, in the embodiments of the present invention and the modifications of the embodiments, at the timing when the oscillation waveform of the voltage of the primary-side circuit has a peak having the opposite polarity, the switching-timing controller switches the direction of application of the primary-side current to the primary coil of the pulse transformer included in the pulse signal output circuit. In this way, in the embodiments of the present invention and the modifications of the embodiments, when the voltage of the primary-side has an opposite-polarity voltage value, it is possible to switch the direction of application of the primary-side current of the pulse transformer is switched, such that the voltage of the primary-side circuit changes to an opposite-polarity voltage value having an absolute value larger than that of an opposite-polarity voltage value according to the supplied current by the absolute value of the opposite-polarity voltage value immediately before the switching. Therefore, in the embodiments of the present invention and the modifications of the embodiments, it is possible to further improve the efficiency of transmission of power from the primary coil of the pulse transformer included in the pulse signal output circuit to the secondary coil, and it is possible to obtain high drive voltage for the gate terminal of the FET provided on the secondary-side circuit and configured to generate the pulse signal and output it.

By the way, in each pulse signal output circuit, the efficiency of transmission of power to the secondary side of the pulse transformer is influenced by the drive voltage for the gate terminal of the FET for generating a pulse signal in the primary-side circuit, and so on. Therefore, the power transmission efficiency depends on selection of components for the secondary-side circuit of the pulse transformer. According to the pulse signal output circuits of the embodiments of the present invention and the modifications of the embodiments, as described above, it is possible to improve the efficiency of transmission of power from the primary side of the pulse transformer to the secondary side, thereby increasing energy usable in the secondary-side circuit of the pulse transformer, so it is possible to obtain high drive voltage for the gate terminal of the FET. Therefore, according to the pulse signal output circuits of the embodiments of the present invention and the modifications of the embodiments, it is possible to ease restrictions for, for example, the threshold voltage of the gate terminal of the FET and the forward voltage of each diode, and it is possible to easily select components for the secondary-side circuit of the pulse transformer. Further, according to the pulse signal output circuits of the embodiments of the present invention and the modifications of the embodiments, as described above, when the voltage of the primary-side circuit has an opposite-polarity voltage value, the direction of application of the primary-side current of the pulse transformer can be switched, such that the voltage of the primary-side circuit changes to an opposite-polarity voltage value having an absolute value larger than that of an opposite-polarity voltage value according to the supplied current by the absolute value of the opposite-polarity voltage value immediately before the switching. In other words, according to the pulse signal output circuits of the embodiments of the present invention and the modifications of the embodiments, since the switching-timing controller controls timings to switch the direction of application of the current to in the primary coil of the pulse transformer included in the pulse signal output circuit, it is possible to prevent the voltage value from decreasing due to oscillation (so-called ringing) attributable to series resonance of the inductance component of the primary side of the pulse transformer and the primary-side capacitor. Therefore, according to the pulse signal output circuits of the embodiments of the present invention and the modifications of the embodiments, it is possible to easily select components necessary to configure the secondary-side circuit of the pulse transformer, without being subject to many restrictions for component selection such as a restriction in which the rectifying section should be configured with an FET having a low gate-terminal threshold voltage and diodes having low forward voltage.

In the embodiments of the present invention and the modifications of the embodiments, as an example of a device in which each pulse signal output circuit can be practically used, a field device has been taken. However, devices in which each pulse signal output circuit can be practically used are not limited to field devices. In other words, pulse signal output circuits of the embodiments of the present invention and the modifications of the embodiments can also be used in any devices which can perform processing using pulse signals which are output from the pulse signal output circuits.

Also, in the embodiments of the present invention and the modifications of the embodiments, the FET 18 is configured to generate the pulse signal. However, in place of the FET 18, any other component for generating a pulse signal can be used. For example, a bipolar transistor may be used as a component for generating a pulse signal. In the case, in the pulse signal output circuits of the embodiments of the present invention and the modifications of the embodiments, it is possible to easily replace the FET 18 with a bipolar transistor by connecting the terminals of the bipolar transistor in place of the terminals of the FET corresponding to the terminals of the bipolar transistor, respectively. More specifically, in the pulse signal output circuits of the embodiments of the present invention and the modifications of the embodiments, it is possible to easily replace the FET 18 with a bipolar transistor by connecting the base terminal of the bipolar transistor, the emitter terminal of the bipolar transistor, and the collector terminal of the bipolar transistor in place of the gate terminal of the FET 18, the source terminal of the FET 18, and the drain terminal of the FET 18, respectively.

Although the embodiments of the present invention have been described above, the specific configurations are not limited to the embodiments, and various modifications also are included in the scope of the present invention.

What is claimed is:

1. A pulse signal output circuit for outputting a pulse signal based on current supplied from a DC power supply connected to the pulse signal output circuit, comprising:
   a pulse transformer configured to include a primary coil and a secondary coil;
   a switch section configured to switch a direction of application of the current to serve as primary-side current to the primary coil of the pulse transformer;
   a primary-side capacitor disposed on a path for the primary-side current;
   a rectifying section configured to rectify secondary-side voltage induced on the secondary coil based on primary-side voltage applied to the primary coil according to the primary-side current, and output the rectified voltage;
   a secondary-side capacitor configured to be charged with the rectified voltage and release charge;
   a transistor configured to be switched on and off according to voltage of the secondary-side capacitor; and
   a switching-timing controller configured to control timings when the switch section switches the direction of application of the primary-side current,
   wherein the switching-timing controller is configured to perform control to switch the direction of application of the primary-side current, when the primary-side voltage oscillates due to series resonance of the primary coil and the primary-side capacitor and changes to an opposite polarity with respect to a polarity of the primary-side voltage at a start timing of one switching period of the switch section.

2. The pulse signal output circuit according to claim 1, wherein
   the switching-timing controller is configured to perform control to switch the direction of application of the primary-side current, at a timing when oscillation of the primary-side voltage has a peak having the opposite polarity.

3. The pulse signal output circuit according to claim 2, wherein
   the switching-timing controller is configured to perform control to switch the direction of application of the primary-side current, at a timing when the oscillation of the primary-side voltage has the first peak having the opposite polarity after the start timing.

4. The pulse signal output circuit according to claim 1, wherein
   a switching time indicating a timing to switch the direction of application of the primary-side current is set in advance, and
   the switching-timing controller is configured to start to measure elapsed time from the start timing, and is configured to perform control to switch the direction of application of the primary-side current at a timing when the measured elapsed time reaches the switching time set in advance.

5. The pulse signal output circuit according to claim 4, wherein
   the switching time is a time which is calculated in advance based on an inductance value of the primary coil and a capacitance value of the primary-side capacitor.

6. The pulse signal output circuit according to claim 3, wherein
   the switching-timing controller further includes a timing detection circuit configured to acquire a voltage value of the primary-side voltage, and to detect a timing to switch the direction of application of the primary-side current based on the acquired voltage value, and
   the switching-timing controller is configured to perform control to switch the direction of application of the primary-side current, when the timing detection circuit detects the timing to switch the direction of application of the primary-side current.

7. The pulse signal output circuit according to claim 1, further comprising
   a primary-side resistor configured to suppress oscillation of the primary-side voltage, the oscillation being attributable to the series resonance.

8. The pulse signal output circuit according to claim 1, wherein
   the switch section includes an output voltage selection circuit configured to output either DC voltage supplied from the DC power supply or reference voltage, depending on control which the switching-timing controller performs to switch the direction of application of the primary-side current.

9. The pulse signal output circuit according to claim 1, wherein
   the rectifying section is a bridge rectifier circuit having a bridge circuit including four diodes.

10. The pulse signal output circuit according to claim 1, wherein
    the rectifying section is a voltage doubler rectifier circuit which includes one capacitor and two diodes.

* * * * *